US009346363B2

(12) United States Patent
Hatanaka

(10) Patent No.: US 9,346,363 B2
(45) Date of Patent: May 24, 2016

(54) PROPULSION CONTROL APPARATUS OF ENGINE HYBRID RAILROAD VEHICLE

(75) Inventor: Keita Hatanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/420,674

(22) PCT Filed: Aug. 13, 2012

(86) PCT No.: PCT/JP2012/070632
§ 371 (c)(1),
(2), (4) Date: Feb. 10, 2015

(87) PCT Pub. No.: WO2014/027396
PCT Pub. Date: Feb. 20, 2014

(65) Prior Publication Data
US 2015/0202968 A1    Jul. 23, 2015

(51) Int. Cl.
*B61D 43/00*    (2006.01)
*B60L 11/08*    (2006.01)
*B60L 11/12*    (2006.01)
(Continued)

(52) U.S. Cl.
CPC ............... *B60L 11/08* (2013.01); *B60L 3/003* (2013.01); *B60L 3/0092* (2013.01); *B60L 11/12* (2013.01); *B60L 2200/26* (2013.01); *Y02T 10/7005* (2013.01); *Y02T 10/7077* (2013.01); *Y02T 10/725* (2013.01); *Y02T 10/7241* (2013.01)

(58) Field of Classification Search
USPC .............. 290/3, 40 B, 45; 307/10.1; 318/139; 320/109; 701/22
See application file for complete search history.

(56) References Cited

U.S. PATENT DOCUMENTS 4,590,416 A * 5/1986 Porche .................. H02J 3/1885
174/DIG. 17
5,568,023 A * 10/1996 Grayer ..................... B60K 6/30
180/165
(Continued)

FOREIGN PATENT DOCUMENTS

EP    2106954 A2    10/2009
JP    6-54408 A    2/1994
(Continued)

OTHER PUBLICATIONS

International Search Report (PCT/ISA/210) mailed on Oct. 30, 2012, by the Japanese Patent Office as the International Searching Authority for International Application No. PCT/JP2012/070632.
(Continued)

*Primary Examiner* — Pedro J Cuevas
(74) *Attorney, Agent, or Firm* — Buchanan Ingersoll & Rooney PC

(57) ABSTRACT

A first power converter connected to a plurality of motors is configured to operate as a DC/AC converter or an AC/DC converter. A second power converter connected to a generator is configured to operate as a DC/AC converter or the AC/DC converter. A control device is configured to cause the first power converter to supply alternating-current power from the first power converter to at least one motor among the motors and cause the second power converter to supply alternating-current power from the second power converter to a motor other than the motor to which the alternating-current power from the first power converter is supplied.

6 Claims, 19 Drawing Sheets

(51) Int. Cl.
*B60L 3/00* (2006.01)
*F02D 29/06* (2006.01)

(56) References Cited

U.S. PATENT DOCUMENTS

| | | | | |
|---|---|---|---|---|
| 5,886,504 A * | 3/1999 | Scott | B23K 9/1062 | 322/15 |
| 5,900,722 A * | 5/1999 | Scott | B23K 9/1062 | 290/49 |
| 6,018,200 A * | 1/2000 | Anderson | B23K 9/1062 | 290/1 A |
| 6,118,186 A * | 9/2000 | Scott | H02P 9/04 | 290/1 A |
| 7,633,248 B1 * | 12/2009 | Williams | B66B 1/302 | 318/150 |
| 8,035,247 B2 * | 10/2011 | Ichikawa | B60L 3/003 | 307/10.1 |
| 8,049,358 B2 * | 11/2011 | Crane | B63H 23/24 | 307/9.1 |
| 8,242,627 B2 * | 8/2012 | Ichikawa | B60L 1/003 | 180/65.265 |
| 8,502,412 B2 * | 8/2013 | Ang | B60L 3/0007 | 307/10.1 |
| 8,786,116 B2 | 7/2014 | Hatanaka et al. | | |
| 8,860,363 B2 * | 10/2014 | Ang | B60L 11/1816 | 320/104 |
| 8,862,343 B2 * | 10/2014 | Kim | E02F 9/123 | 701/50 |
| 8,884,451 B2 * | 11/2014 | Hatanaka | B60W 10/08 | 290/40 C |
| 8,926,381 B2 * | 1/2015 | Haugland | B63H 21/20 | 440/6 |
| 8,952,564 B2 * | 2/2015 | Kamichi | B60L 3/003 | 307/10.1 |
| 9,037,333 B2 * | 5/2015 | Endo | B60W 20/1062 | 701/22 |
| 9,065,300 B2 * | 6/2015 | Williams | F02D 19/10 | |
| 9,184,587 B2 * | 11/2015 | Mizuno | H02J 9/06 | |
| 9,197,071 B2 * | 11/2015 | Williams | H02J 3/28 | |
| 9,260,022 B2 * | 2/2016 | Yang | B60L 11/1816 | |
| 2007/0220883 A1 * | 9/2007 | Harada | B60H 1/02 | 60/597 |
| 2008/0190680 A1 * | 8/2008 | Kaneko | B60K 6/442 | 180/170 |
| 2008/0315583 A1 * | 12/2008 | Beck | B63H 21/20 | 290/31 |
| 2009/0131215 A1 * | 5/2009 | Shamoto | B60K 6/365 | 477/3 |
| 2009/0195074 A1 * | 8/2009 | Buiel | H02J 3/28 | 307/48 |
| 2009/0312885 A1 * | 12/2009 | Buiel | H02J 3/32 | 700/297 |
| 2010/0019723 A1 * | 1/2010 | Ichikawa | B60L 11/123 | 320/109 |
| 2011/0187184 A1 * | 8/2011 | Ichikawa | B60L 1/003 | 307/10.1 |
| 2012/0133204 A1 * | 5/2012 | Ang | B60L 3/0007 | 307/10.1 |
| 2012/0187759 A1 * | 7/2012 | Kamichi | B60L 3/003 | 307/10.1 |
| 2012/0223524 A1 * | 9/2012 | Williams | H02J 3/005 | 290/50 |
| 2012/0292992 A1 * | 11/2012 | Williams | F02D 19/10 | 307/23 |
| 2012/0309242 A1 * | 12/2012 | Haugland | B63H 21/20 | 440/3 |
| 2013/0049365 A1 * | 2/2013 | Hatanaka | B60W 10/08 | 290/45 |
| 2013/0154264 A1 * | 6/2013 | Hatanaka | B60L 3/003 | 290/45 |
| 2013/0200846 A1 * | 8/2013 | Ang | B60L 11/1816 | 320/109 |
| 2013/0271083 A1 * | 10/2013 | Williams | H02J 3/28 | 320/128 |
| 2013/0304332 A1 * | 11/2013 | Kim | E02F 9/123 | 701/50 |
| 2014/0084818 A1 * | 3/2014 | Sugiyama | H02J 7/1423 | 318/139 |
| 2014/0180517 A1 * | 6/2014 | Endo | B60W 20/1062 | 701/22 |
| 2014/0203634 A1 * | 7/2014 | Sugiyama | B60L 1/00 | 307/10.1 |
| 2014/0214254 A1 * | 7/2014 | Amano | B60W 10/06 | 701/22 |
| 2014/0225437 A1 * | 8/2014 | Mizuno | H02J 9/06 | 307/23 |
| 2014/0343777 A1 * | 11/2014 | Amano | B60K 6/445 | 701/22 |
| 2014/0379187 A1 * | 12/2014 | Amano | B60K 6/445 | 701/22 |
| 2015/0021916 A1 * | 1/2015 | Amano | B60K 6/445 | 290/45 |
| 2015/0120129 A1 * | 4/2015 | Lee | B60R 16/0231 | 701/29.1 |
| 2015/0174998 A1 * | 6/2015 | Okada | B60K 6/46 | 701/22 |
| 2015/0225000 A1 * | 8/2015 | Okada | B60L 11/02 | 701/19 |
| 2015/0343910 A1 * | 12/2015 | Geradts | B60L 11/08 | 290/14 |

FOREIGN PATENT DOCUMENTS

| | | |
|---|---|---|
| JP | 8-33122 A | 2/1996 |
| JP | 9-266605 A | 10/1997 |
| JP | 2001-163579 A | 6/2001 |
| JP | 2001-251702 A | 9/2001 |
| JP | 2003-134604 A | 5/2003 |
| JP | 2007-143290 A | 6/2007 |
| JP | 2008-49811 A | 3/2008 |
| JP | 2009-254013 A | 10/2009 |
| JP | 2012-121570 A | 6/2012 |
| WO | WO 2008/023735 A1 | 2/2008 |
| WO | WO 2012/026026 A1 | 3/2012 |

OTHER PUBLICATIONS

Written Opinion (PCT/ISA/237) mailed on Oct. 30, 2012, by the Japanese Patent Office as the International Searching Authority for International Application No. PCT/JP2012/070632.

Japanese Office Action for Japanese Application No. 2014-530408, issued Nov. 18, 2014, with English translation.

Japanese Office Action dated Feb. 17, 2015 issued in corresponding Japanese Patent Appln. No. 2014-530408, with English translation (11 pages).

Australian Office Action dated Jan. 28, 2016 issued in corresponding Australian Patent Appln. No. 2012387794 (3 pages).

* cited by examiner

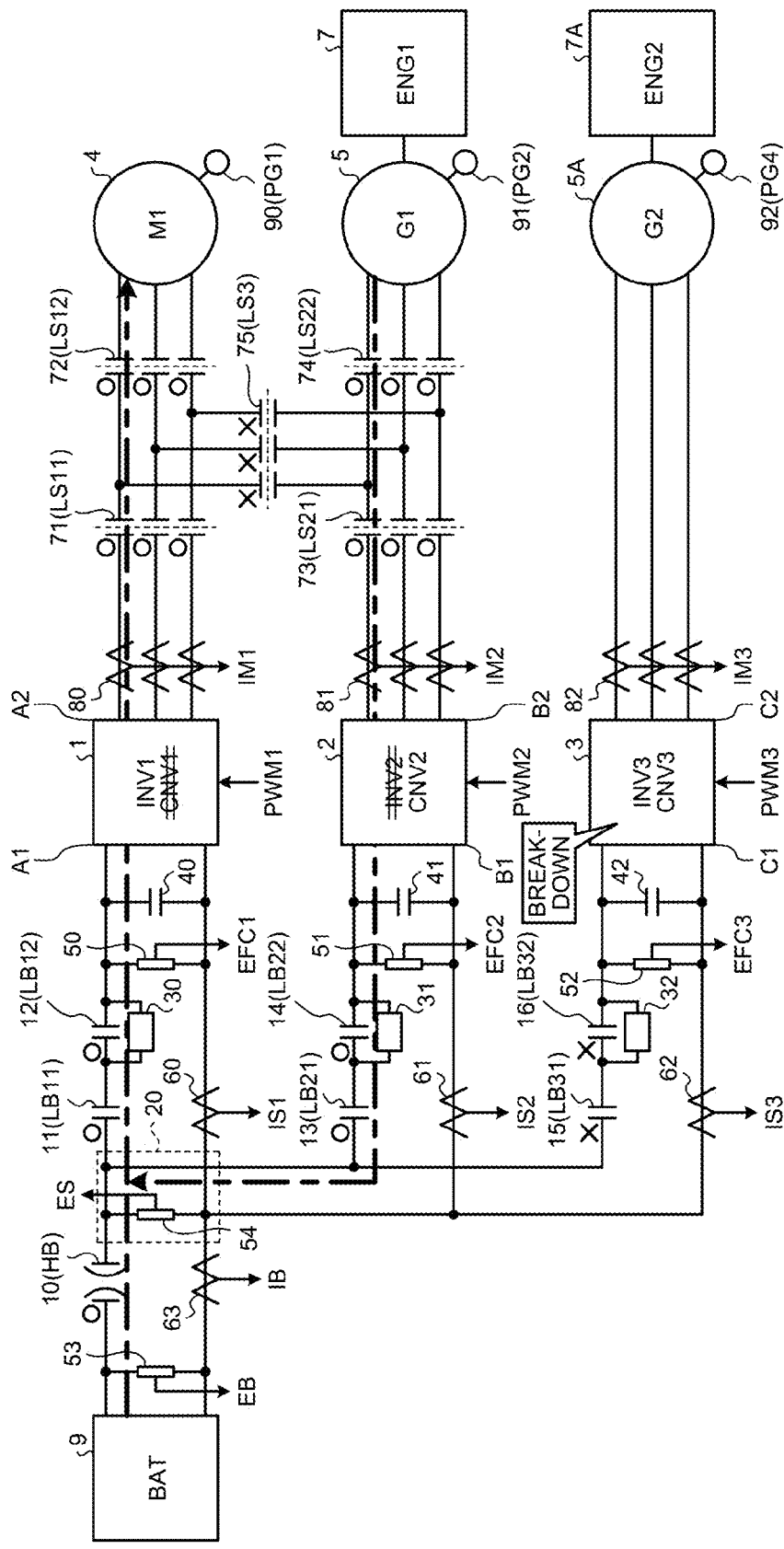

PROPULSION CONTROL APPARATUS OF ENGINE HYBRID RAILROAD VEHICLE

FIELD

The present invention relates to a propulsion control apparatus of an engine hybrid railroad vehicle.

BACKGROUND

A propulsion control apparatus of an engine hybrid railroad vehicle drives a generator with an engine, converts alternating-current power generated by the generator into direct-current power with a converter, converts the direct-current power from the converter and direct-current power from a power storage device into alternating-current power with an inverter, and drives a motor with the alternating-current power to thereby give propulsion to the vehicle (e.g., Patent Literature 1).

CITATION LIST

Patent Literature

Patent Literature 1: Japanese Patent Application Laid-Open No. 2003-134604

SUMMARY

Technical Problem

However, in the conventional technology represented by the above Patent Literature 1, a plurality of motors mounted on a vehicle are configured to be driven by one power converter. Therefore, for example, when power running is performed with stored power of a power storage device, the motors are simultaneously controlled. Therefore, in the conventional technology, there is a problem in that further improvement of efficiency of a railroad vehicle cannot be attained because, even when a sufficient driving force is obtained only by one motor, the other motor is also driven.

The present invention has been devised in view of the above and it is an object of the present invention to obtain a propulsion control apparatus of an engine hybrid railroad vehicle that can attain further improvement of efficiency of a railroad vehicle even in a configuration in which a plurality of motors are driven by one power conversion device.

Solution to Problem

In order to solve the aforementioned problems, a propulsion control apparatus of an engine hybrid railroad vehicle is constructed in such a manner that it includes: a generator driven by an engine; a power storage device functioning as a direct-current-power supply source configured to be connectable to a direct-current common section; first and second power converters each of which is configured to be connectable to the direct-current common section, when direct-current power from the direct-current common section is input from a first input/output end side, operates as a DC/AC converter to output desired alternating-current power from a second input/output end side different from the first input/output end, and, when alternating-current power is input from the second input/output end side, operates as an AC/DC converter to output desired direct-current power from the first input/output end side; a plurality of motors divided into a first motor configured to be drivable by both of the first and second power converters and a second motor configured to be drivable only by the first power converter; a group of switches that switches an electric connection destination of the generator from the second input/output end side of the second power converter to the second input/output end side of the first power converter or switches an electric connection destination of the first motor from the second input/output end side of the first power converter to the second input/output end side of the second power converter; and a control unit that controls operations of the first power converter, the second power converter, and the group of switches according to operation forms of the first and second power converters.

Advantageous Effects of Invention

According to the present invention, connection states between a plurality of motors and a first power converter and a second power converter are controlled by a control device, whereby one motor is driven by the first power converter and the other motor is driven by the second power converter. Therefore, there is an effect that it is possible to attain further improvement of efficiency of a railroad vehicle even in a configuration in which a plurality of motors are driven by one power conversion device.

BRIEF DESCRIPTION OF DRAWINGS

FIG. 19 is a diagram of states of the devices in the case of a breakdown of a third power converter.

DESCRIPTION OF EMBODIMENTS

Propulsion control apparatuses of an engine hybrid railroad vehicle (hereinafter simply referred to as "propulsion control apparatuses") according to embodiments of the present invention are explained below with reference to the accompanying drawings. Note that the present invention is not limited by the embodiments explained below.

First Embodiment

Figure 1:
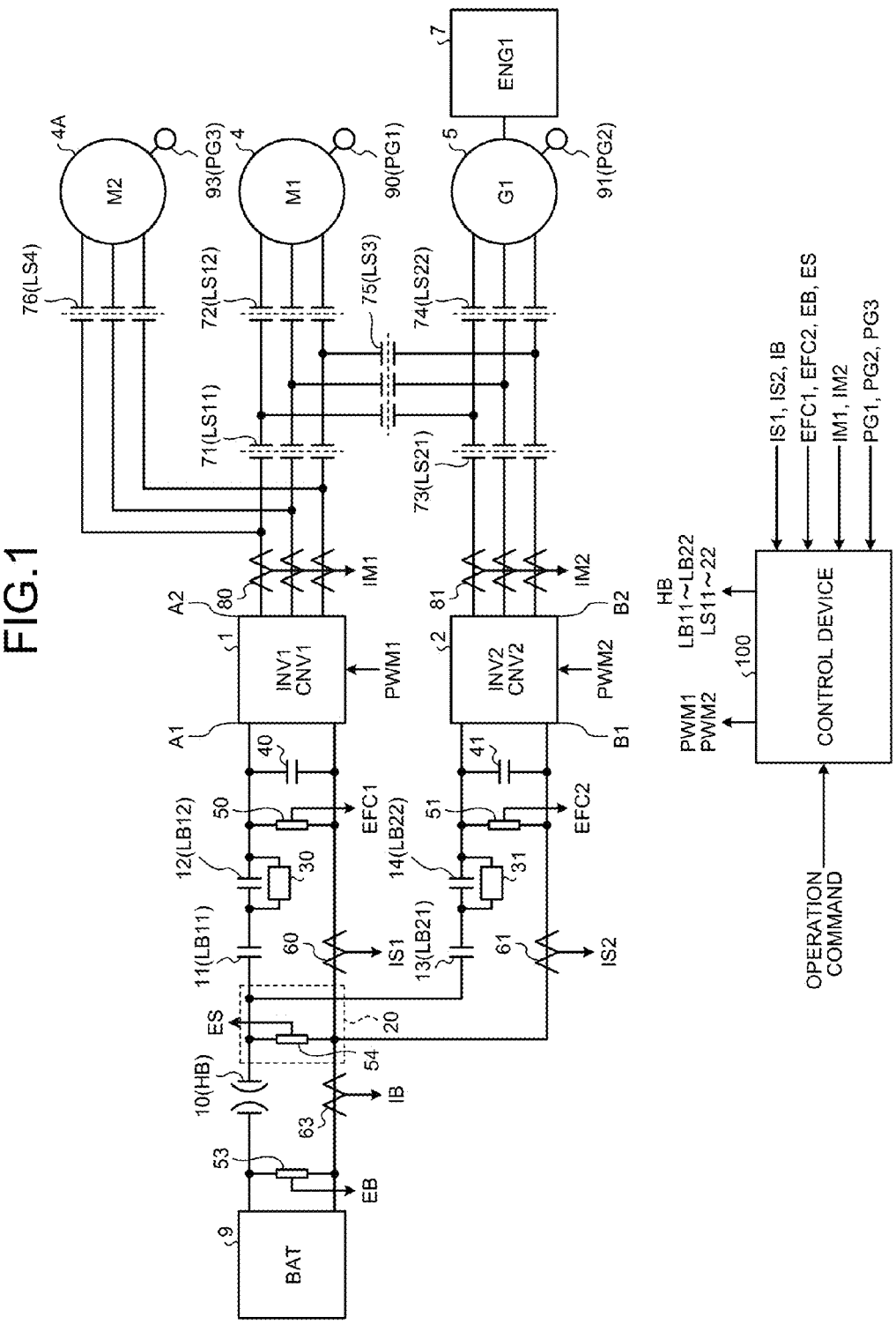
FIG. 1 is a configuration diagram of a propulsion control apparatus according to a first embodiment of the present invention.

FIG. 1 is a configuration diagram of a propulsion control apparatus according to a first embodiment of the present invention. The propulsion control apparatus according to the first embodiment is configured by including, as main components, a first motor 4, a second motor 4A, a diesel engine 7, a generator 5, a first power converter 1, a second power converter 2, a power storage device 9, and a control device 100 that controls the operation of the entire propulsion control apparatus.

The propulsion control apparatus is configured by including a high-speed breaker 10, a first line breaker 11, a second line breaker 12, a third line breaker 13, a fourth line breaker 14, a first contactor 71, a second contactor 72, a third contactor 73, a fourth contactor 74, a fifth contactor 75, and a sixth contactor 76 interposed among the main components to freely change a supply path of electric power. A first charging resistor 30 is connected to the second line breaker 12 in parallel. A second charging resistor 31 is connected to the fourth line breaker 14 in parallel.

Note that the propulsion control apparatus includes, in addition to these components, a first current detector 60, a second current detector 61, a third current detector 63, a fourth current detector 80, and a fifth current detector 81. Further, the propulsion control apparatus includes a first voltage detector 50, a second voltage detector 51, a third voltage detector 53, and a fourth voltage detector 54 that detect voltages.

Connection relations and schematic functions of the sections configuring the propulsion control apparatus are explained. The diesel engine 7 is connected to the generator 5, which is one of power supply sources that generate electric power. The generator 5 is an alternating-current generator driven by the diesel engine 7. That is, the diesel engine 7 and the generator 5 function as an alternating-current power supply source. The generator 5 is connected to the first power converter 1 via the first contactor 71, the fourth contactor 74, and the fifth contactor 75 and connected to the second power converter 2 via the third contactor 73 and the fourth contactor 74. The generator 5 is supplied with alternating-current power by the second power converter 2 and operates as an alternating-current electric motor as well.

The power storage device 9 is a storage device for electric energy including a lithium ion battery, a nickel hydrogen battery, an electric double layer capacitor, a lithium ion capacitor, a flywheel, or the like as storage means. The power storage device 9 is connected to, as another power supply source that generates electric power, the first power converter 1 via the high-speed breaker 10, the first line breaker 11, and the second line breaker 12 and charges and discharges direct-current power. Further, the power storage device 9 is connected to the second power converter 2 via the high-speed breaker 10, the third line breaker 13, and the fourth line breaker 14 and charges and discharges direct-current power.

The first power converter 1 operates as an AC/DC converter or a DC/AC converter. When the first power converter 1 operates as an AC/DC converter, regenerative electric power from the first motor 4, regenerative electric power from the second motor 4A, or alternating-current power generated by the generator 5 is supplied to a second input/output end A2 side located on the first motor 4 side of the first power converter 1. In the first power converter 1, the regenerative electric power and the alternating-current power are converted into direct-current power, and thus the direct-current power is charged to the power storage device 9.

When the first power converter 1 operates as a DC/AC converter, direct-current power from the power storage device 9 or direct-current power from the second power converter 2 is supplied to a first input/output end A1 side located on a direct-current common section 20 side of the first power converter 1. In the first power converter 1, these kinds of direct-current power are converted into alternating-current power. The alternating-current power is supplied to at least one of the first motor 4 and the second motor 4A. The first motor 4 and the second motor 4A are driven by this alternating-current power. Note that a rotating shaft of the first motor 4 and a rotating shaft of the second motor 4A are respectively connected to reduction gears (not shown in the figure). The rotating shafts rotate, whereby wheels rotate via axles provided in the reduction gears and the vehicle travels.

The second power converter 2 operates as an AC/DC converter or a DC/AC converter. When the second power converter 2 operates as an AC/DC converter, alternating-current power generated by the generator 5 is supplied to a second input/output end B2 side located on the generator 5 side of the second power converter 2. In the second power converter 2, the alternating-current power is converted into direct-current power. The direct-current power is charged to the power storage device 9.

When the second power converter 2 operates as a DC/AC converter, regenerative electric power from the first motor 4 or direct-current power from the power storage device 9 is supplied to a first input/output end B1 side located on the direct-current common section 20 side of the second power converter 2. In the first power converter 1, the direct-current power is converted into alternating-current power, and thus the alternating-current power is supplied to the first motor 4 or the generator 5. The first motor 4 or the generator 5 is driven by the alternating-current power.

The first motor 4 receives the supply of the alternating-current power from the first power converter 1 or the alternating-current power from the second power converter 2 and generates a driving force (propulsion). The second motor 4A receives the supply of the alternating-current power from the first power converter 1 and generates a driving force.

The high-speed breaker 10 is inserted between the direct-current common section 20 and the power storage device 9. The first line breaker 11 and the second line breaker 12 are connected in series and inserted between the direct-current common section 20 and the first power converter 1. The third line breaker 13 and the fourth line breaker 14 are connected in series and inserted between the direct-current common section 20 and the second power converter 2. The sixth contactor 76 is inserted between the first power converter 1 and the second motor 4A. The first contactor 71 and the second contactor 72 are connected in series and inserted between the first power converter 1 and the first motor 4. The third contactor 73 and the fourth contactor 74 are connected in series and inserted between the second power converter 2 and the generator 5.

One end of the first contactor 71 and one end of the second contactor 72 are connected to each other. One end of the third contactor 73 and one end of the fourth contactor 74 are connected to each other. The fifth contactor 75 is inserted between a connection end of the first contactor 71 and the second contactor 72, and a connection end of the third contactor 73 and the fourth contactor 74.

Next, the sensors are explained. The third voltage detector 53 detects a voltage EB of the power storage device 9. The third current detector 63 detects a direct current IB flowing into and out of the power storage device 9. The fourth voltage detector 54 detects a voltage ES of the direct-current common section 20. The first voltage detector 50 detects a voltage EFC1 of a first filter capacitor 40. The first current detector 60 detects a direct current IS1 flowing into and out of the first power converter 1. The fourth current detector 80 detects an alternating current IM1 flowing into and out of the first power converter 1. Similarly, the second voltage detector 51 detects a voltage EFC2 of a second filter capacitor 41. The second current detector 61 detects a direct current IS2 flowing into and out of the second power converter 2. The fifth current detector 81 detects an alternating current IM2 flowing into and out of the second power converter 2.

A first speed detector 90 detects rotating speed (motor rotating speed) PG1 of the first motor 4. A second speed detector 91 detects rotating speed (generator rotating speed) PG2 of the generator 5. A third speed detector 93 detects rotting speed (motor rotating speed) PG3 of the second motor 4A.

The detection values detected by the sensors are input to the control device 100 as shown in the figure. An operation command from a not-shown motorman's platform is also input to the control device 100. The control device 100 switches an operation mode of the vehicle according to the operation command and generates, on the basis of the detection values input from the various sensors, signals (PWM1 and PWM2) for controlling not-shown switching elements of each of the power converters, a signal (HB) for controlling ON/OFF of the high-speed breaker 10, signals (LB11 to 22) for controlling ON/OFF of the line breakers, and signals (LS11 to 22) for controlling ON/OFF of the contactors and outputs the signals to the control target sections. Answerbacks are input to the control device 100 from those devices.

Note that, in FIG. 1, illustration of control signals for the breaker, the line breakers, and the contactors is omitted to avoid complication. In FIG. 1, the diesel engine 7, the generator 5, the first motor 4, the second motor 4A, and the power storage device 9 are respectively represented as "ENG1" "G1", "M1", "M2", and "BAT". The first power converter 1 and the second power converter 2 are represented focusing on functions thereof. For example, when the first power converter 1 operates as an AC/DC converter, the first power converter 1 is represented as "CNV1". When the first power converter 1 operates as a DC/AC converter, the first power converter 1 is represented as "INV1". Similarly, when the second power converter 2 operates as an AC/DC converter, the second power converter 2 is represented as "CNV2". When the second power converter 2 operates as a DC/AC converter, the second power converter 2 is represented as "INV2".

Figure 2:
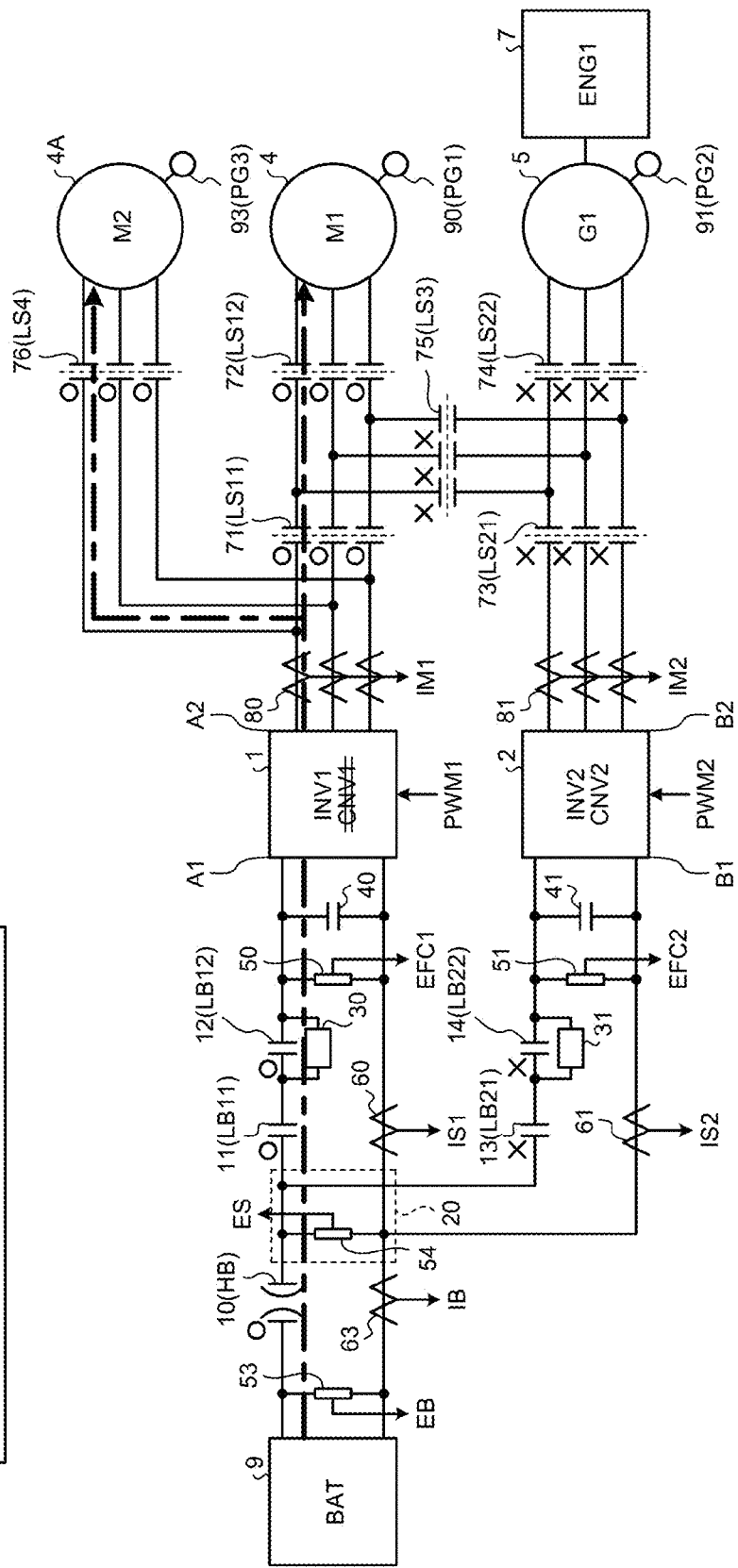
FIG. 2 is a diagram of states of devices during departure.

Operations in respective modes in the propulsion control apparatus according to the first embodiment are explained. FIG. 2 is a diagram of states of the devices during the departure of the vehicle. When an operation command indicating departure is input to the control device 100, to reduce noise of the diesel engine 7, the control device 100 does not use the generator 5, but causes the first power converter 1 to perform an inverter operation to convert direct-current power from the power storage device 9 into alternating-current power, and drives the first motor 4 and the second motor 4A.

More specifically, when confirming that the voltage EB of the power storage device 9 is a voltage in a normal range, the control device 100 turns on the high-speed breaker 10. When confirming that the voltage ES of the direct-current common section 20 is a voltage in a normal range, the control device 100 turns on the first line breaker 11. The first filter capacitor 40 is charged while an electric current is limited by the first charging resistor 30. When detecting with the first voltage detector 50 that the first filter capacitor 40 has been charged to a predetermined voltage, the control device 100 turns on the second line breaker 12 and short-circuits the first charging resistor 30. The control device 100 confirms that the fifth contactor 75 is off and turns on the sixth contactor 76, turns on the first contactor 71, turns on the second contactor 72, turns off the third contactor 73, and turns off the fourth contactor 74. In this case, the control device 100 causes the first power converter 1 to operate as a DC/AC converter (INV1).

In the first power converter 1, direct-current power from the power storage device 9 is converted into alternating-current power. The first motor 4 and the second motor 4A are driven by the alternating-current power and the vehicle travels. Note that the other devices are set to an OFF state. According to this operation, the first motor 4 and the second motor 4A are driven using stored power of the power storage device 9. Therefore, it is possible to reduce the noise of the diesel engine 7.

Figure 3:
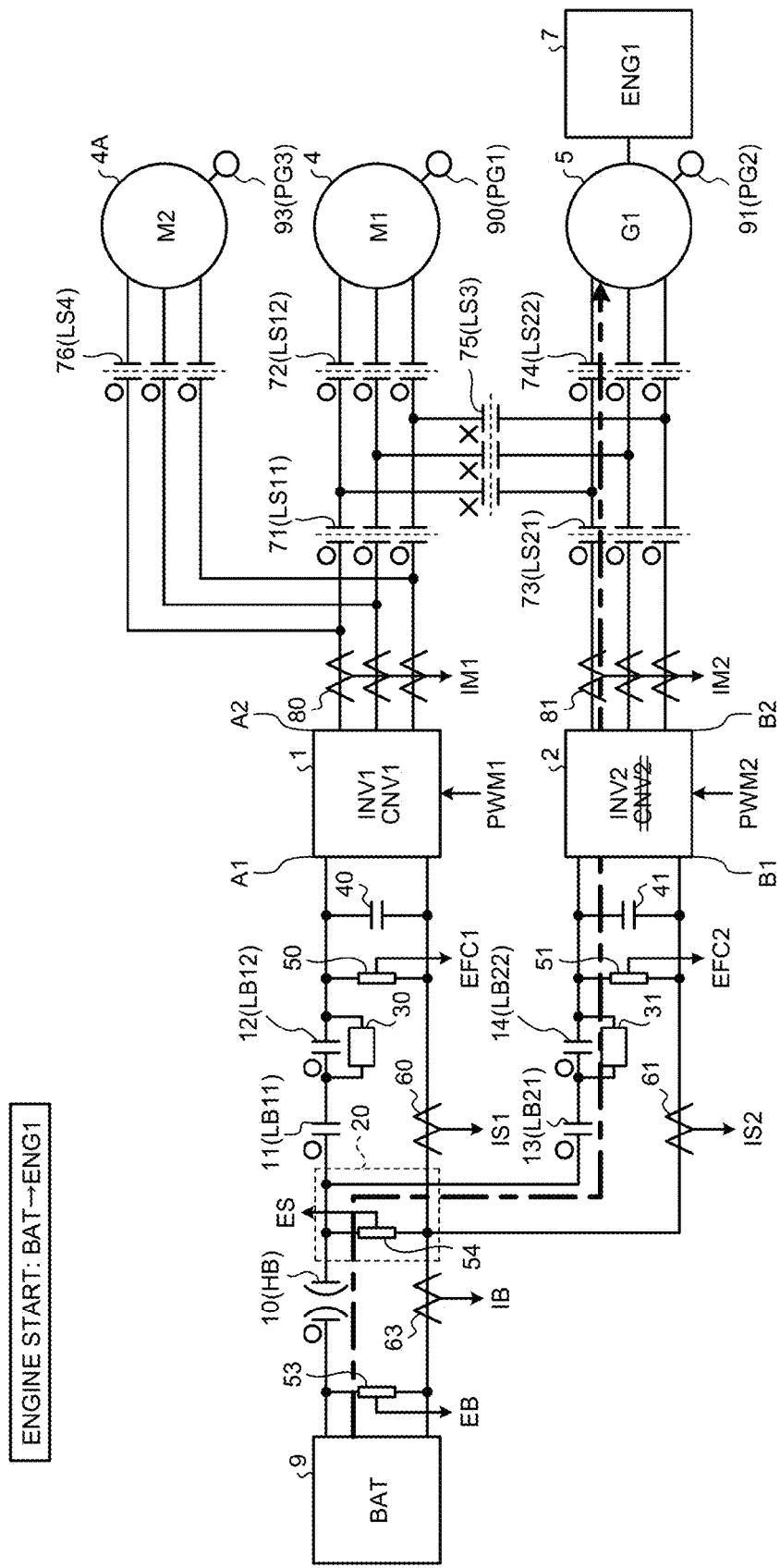
FIG. 3 is a diagram of an operation in performing an engine start using stored power of a power storage device.

FIG. 3 is a diagram of an operation in starting the diesel engine 7 using the stored power of the power storage device 9. When the hybrid railroad vehicle reaches predetermined speed (or a predetermined travel distance, a predetermined elapsed time, or it can be an operation of a motorman, or a command from a railroad system), the control device 100 turns on the third line breaker 13 and charges the second filter capacitor 41 while limiting an electric current with the second charging resistor 31. When confirming with the voltage EFC2 detected by the second voltage detector 51 that the second filter capacitor 41 has been charged to a predetermined voltage, the control device 100 turns on the fourth line breaker 14 and short-circuits the second charging resistor 31. The control device 100 confirms that the fifth contactor 75 is off and turns on the third contactor 73 and turns on the fourth contactor 74. The control device 100 causes the second power converter 2 to operate as a DC/AC converter (INV2).

In the second power converter 2, direct-current power from the power storage device 9 is converted into alternating-current power. The generator 5 is caused to operate as a motor by the alternating-current power to start the diesel engine 7.

Figure 4:
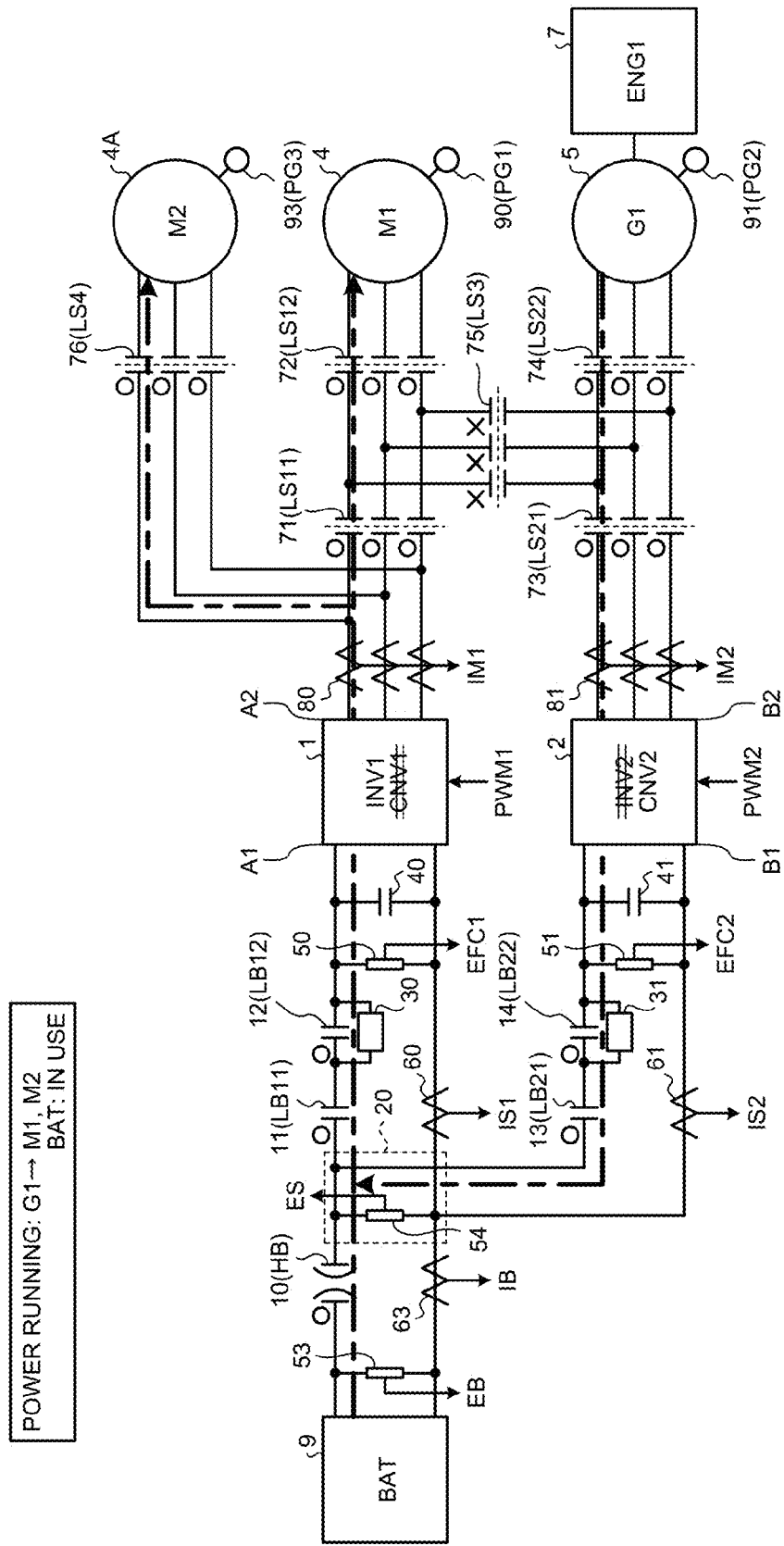
FIG. 4 is a diagram of an operation in driving motors using generated power of a generator and the stored power of the power storage device.

FIG. 4 is a diagram of an operation in driving the motors using generated power of the generator 5 and the stored power of the power storage device 9. When the diesel engine 7 is started by the operation shown in FIG. 3, after once stopping the inverter operation of the second power converter 2, the control device 100 causes the second power converter 2 to restart as an AC/DC converter (CNV2). The control device 100 causes the first power converter 1 to operate as a DC/AC converter (INV1).

In the first power converter 1, direct-current power from the power storage device 9 and the second power converter 2 is converted into alternating-current power. The first motor 4 and the second motor 4A are driven by the alternating-current power and the vehicle accelerates.

Figure 5:
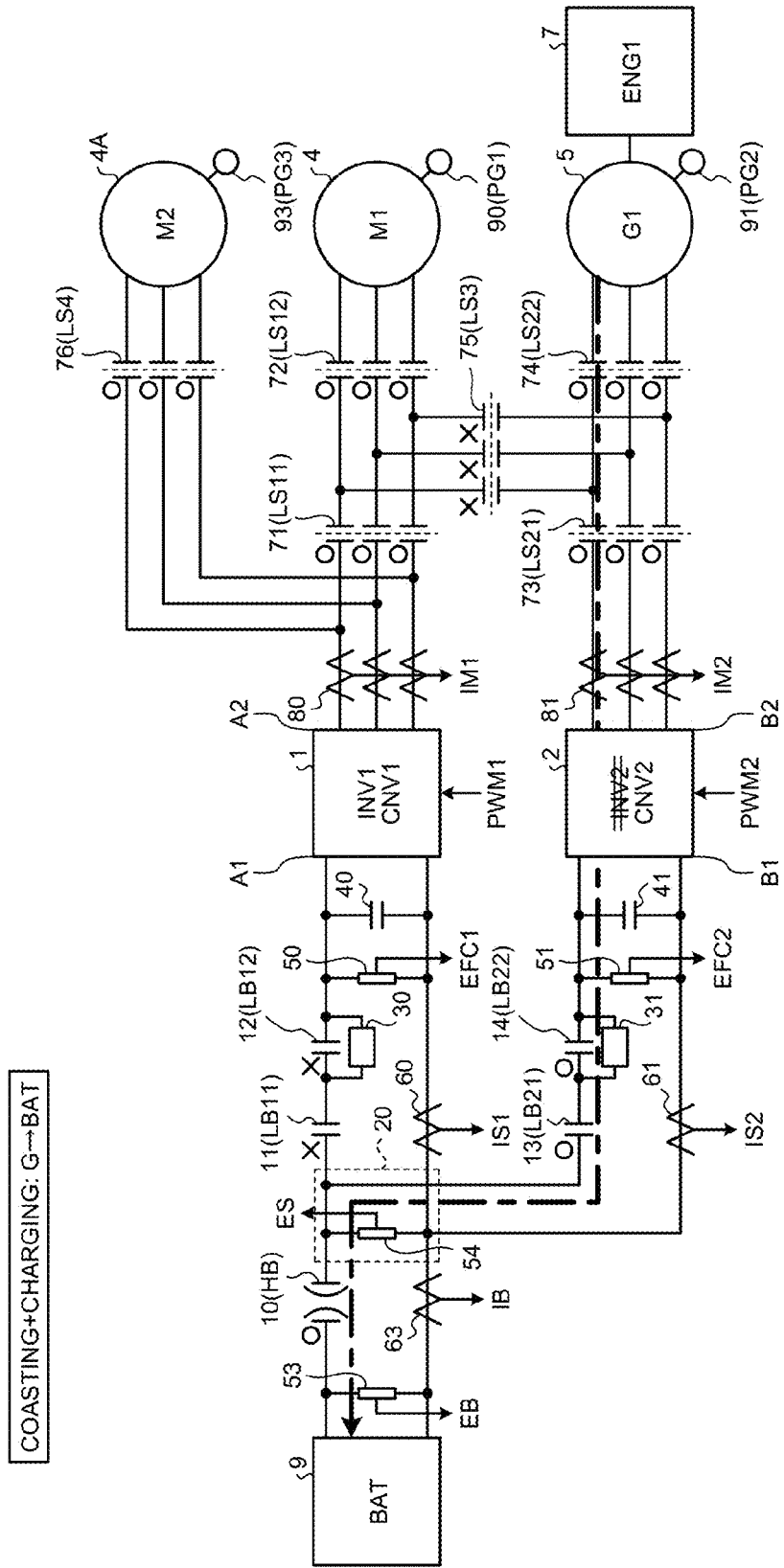
FIG. 5 is a diagram of states of the devices during coasting.

FIG. 5 is a diagram of states of the devices during coasting. When a power running command from the motorman's platform is turned off, the control device 100 stops the inverter operation of the first power converter 1 and turns off the first line breaker 11 and turns off the second line breaker 12. In this case, when a state of charge (SOC) of the power storage device 9 is low, the power generation of the generator 5 driven by the diesel engine 7 is continued. The generated power is converted into direct-current power and charged to the power storage device 9 by the second power converter 2. Note that a value of the SOC of the power storage device 9 is calculated from information from a not-shown battery monitoring device, the voltage EB and the electric current IB of the power storage device 9, and the like.

Figure 6:
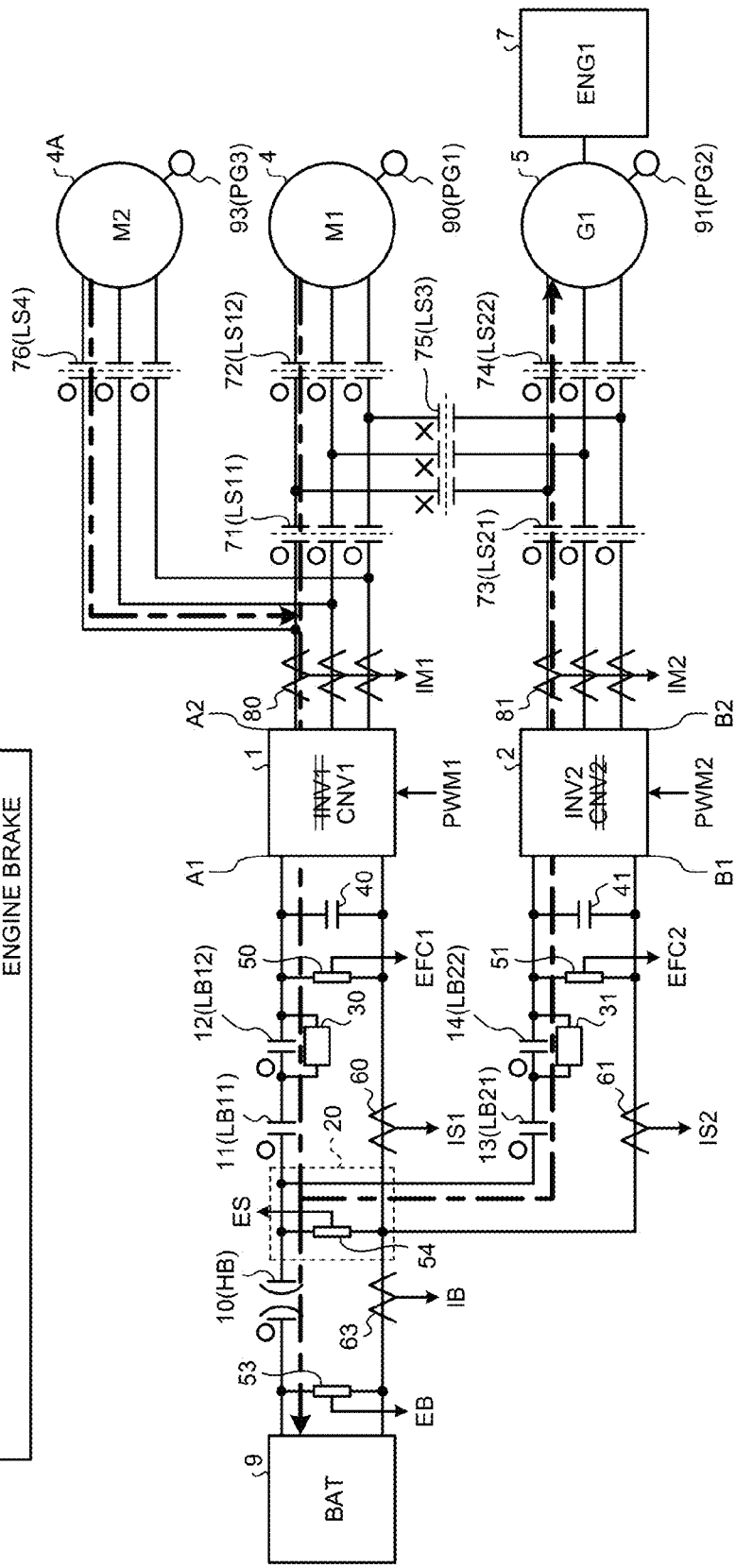
FIG. 6 is a diagram of states of the devices during braking.

FIG. 6 is a diagram of states of the devices during braking. During the braking, the control device 100 causes the first motor 4 and the second motor 4A to operate as generators. Regenerative electric power from the motors is input to the first power converter 1. The control device 100 causes the first power converter 1 to operate as an AC/DC converter (CNV1). In the first power converter 1, the regenerative electric power from the first motor 4 and the second motor 4A is converted into direct-current power (regenerative brake). The direct-current power is charged to the power storage device 9.

In this case, if the SOC of the power storage device 9 is lower than the predetermined value when the power storage device 9 is charged only by the regenerative electric power, the control device 100 drives the diesel engine 7. The generated power from the generator 5 is input to the second power converter 2. The control device 100 causes the second power converter 2 to operate as an AC/DC converter (CNV2). In the second power converter 2, the generated power from the generator 5 is converted into direct-current power. The direct-current power is charged to the power storage device 9.

On the other hand, if the SOC of the power storage device 9 is higher than the predetermined value or if the power storage device 9 cannot be charged, the control device 100 causes the second power converter 2 to operate as a DC/AC converter (INV2). Direct-current power from the first power converter 1 is input to the second power converter 2 via the direct-current common section 20. The second power converter 2 converts the direct current power into alternating-current power and causes the generator 5 to operate as a motor. Therefore, the diesel engine 7 operates as an engine brake (further as an exhaust brake) and electric power is consumed. Note that, in FIG. 6, to simplify explanation, a state in the case in which the SOC of the power storage device 9 is higher than the predetermined value is shown.

According to the operation shown in FIG. 6, it is possible to continue the regenerative brake and suppress wear of brake shoes. Therefore, it is possible to suppress odor involved in the wear of the brake shoes. The life of the brake shoes is extended and a replacement cycle of the brake shoes is extended. It is possible to reduce costs.

Figure 7:
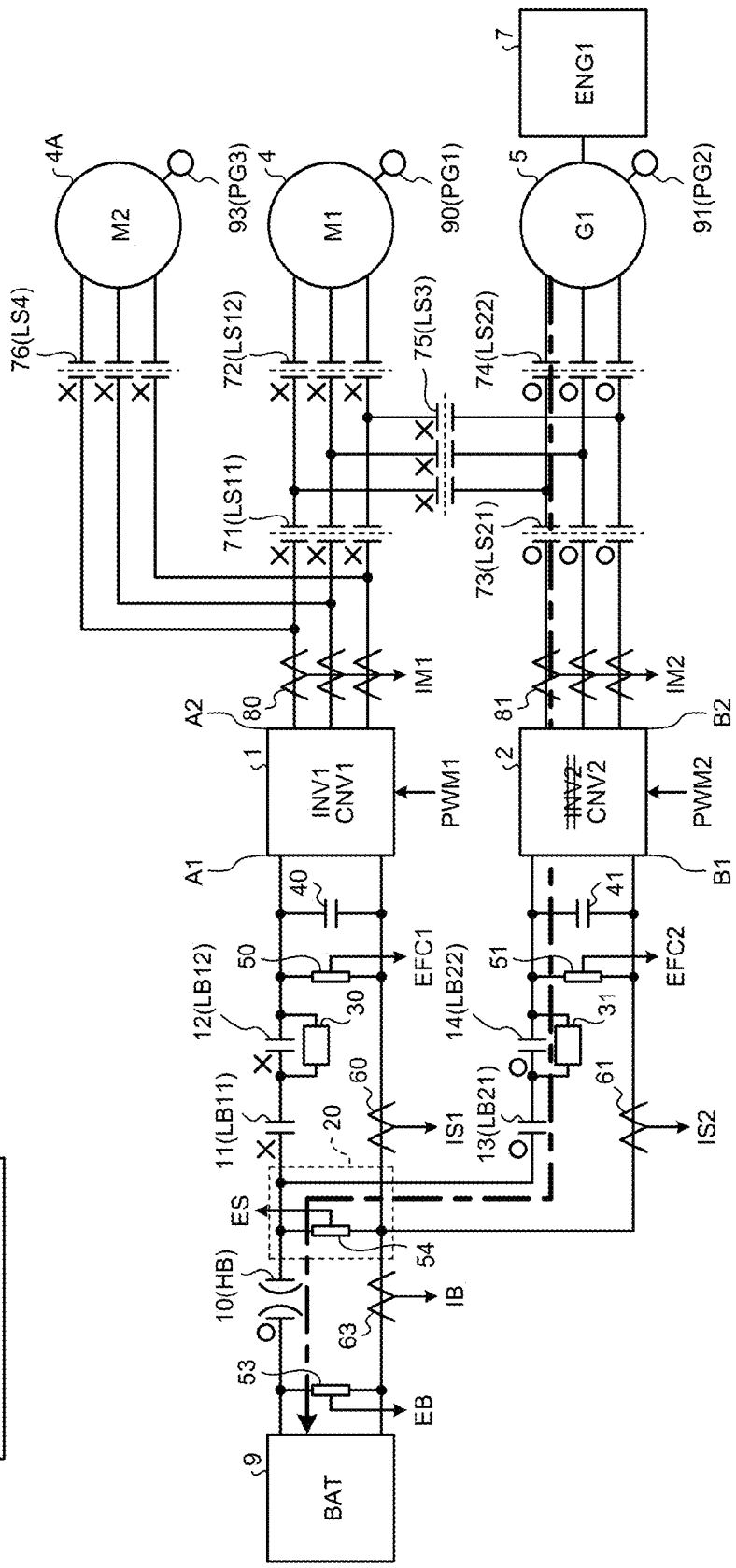
FIG. 7 is a diagram of states of the devices during a stop.

FIG. 7 is a diagram of states of the devices during the stopped state of the vehicle. When the vehicle is in a stopped state, for example, if power consumption in the vehicle (lighting, air conditioning, etc.) by not-shown auxiliary power supply devices is large or if the SOC of the power storage device 9 is lower than a predetermined value, the control device 100 drives the diesel engine 7, and the generated power from the generator 5 is input to the second power converter 2. The control device 100 causes the second power converter 2 to operate as an AC/DC converter (CNV2). In the second power converter 2, the generated power from the generator 5 is converted into direct-current power. The direct-current power is charged to the power storage device 9.

Note that, when the SOC of the power storage device 9 is high or when the power consumption in the vehicle by the not-shown auxiliary power supply devices is small, the control device 100 stops the diesel engine 7. Consequently, it is possible to reduce noise and suppress fuel consumption of the diesel engine 7.

Figure 8:
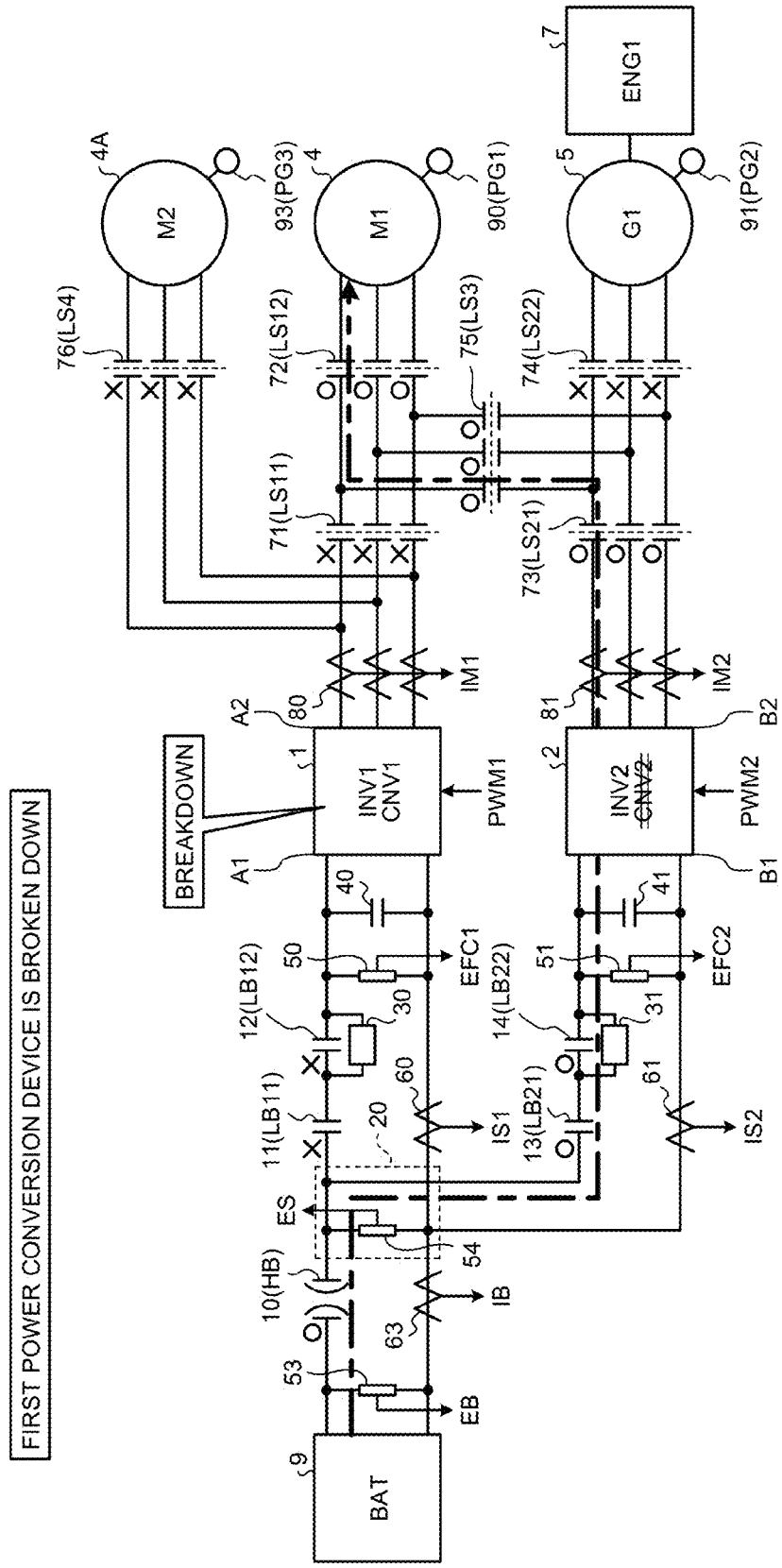
FIG. 8 is a diagram of states of the devices in the case of a breakdown of a first power converter.

FIG. 8 is a diagram of states of the devices in the case of a breakdown of the first power converter 1. When detecting a breakdown of the first power converter 1, first, the control device 100 turns off the first line breaker 11, the second line breaker 12, the first contactor 71, and the sixth contactor 76. Consequently, the first input/output end A1 of the first power converter 1 is disconnected from the power storage device 9, and the second input/output end A2 of the first power converter 1 is disconnected from the first motor 4 and the second motor 4A.

Subsequently, the control device 100 stops the converter operation of the second power converter 2 and further turns off the fourth contactor 74. Consequently, the second input/output end B2 of the second power converter 2 is disconnected from the generator 5.

Thereafter, if the SOC of the power storage device 9 is higher than the predetermined value, the control device 100 turns on the fifth contactor 75 and causes the second power converter 2 to operate as a DC/AC converter (INV2). The second power converter 2 converts direct-current power from the power storage device 9 into alternating-current power and drives the first motor 4. Note that, in FIG. 8, to simplify explanation, a state in the case in which the SOC of the power storage device 9 is higher than the predetermined value is shown.

On the other hand, if the SOC of the power storage device 9 is lower than the predetermined value, the control device 100 stops the inverter operation of the second power converter 2. The control device 100 turns off the fifth contactor 75 and turns on the fourth contactor 74. Consequently, the second input/output end B2 of the second power converter 2 is disconnected from the first motor 4. Thereafter, the control device 100 causes the second power converter 2 to operate as an AC/DC converter (CNV2). The second power converter 2 converts the generated power from the generator 5 into direct-current power and charges the power storage device 9.

The inverter operation and the converter operation by the second power converter 2 are repeated, whereby, even when the first power converter 1 is broken down, the vehicle can shelter in the nearest station or the like without being stranded on the mainline and disturbing a schedule. Further, it is made possible to drive the diesel engine 7 and cause the vehicle to travel until the volume of gas oil in a fuel tank (not shown in the figure) mounted on the vehicle reaches the lower limit.

Figure 9:
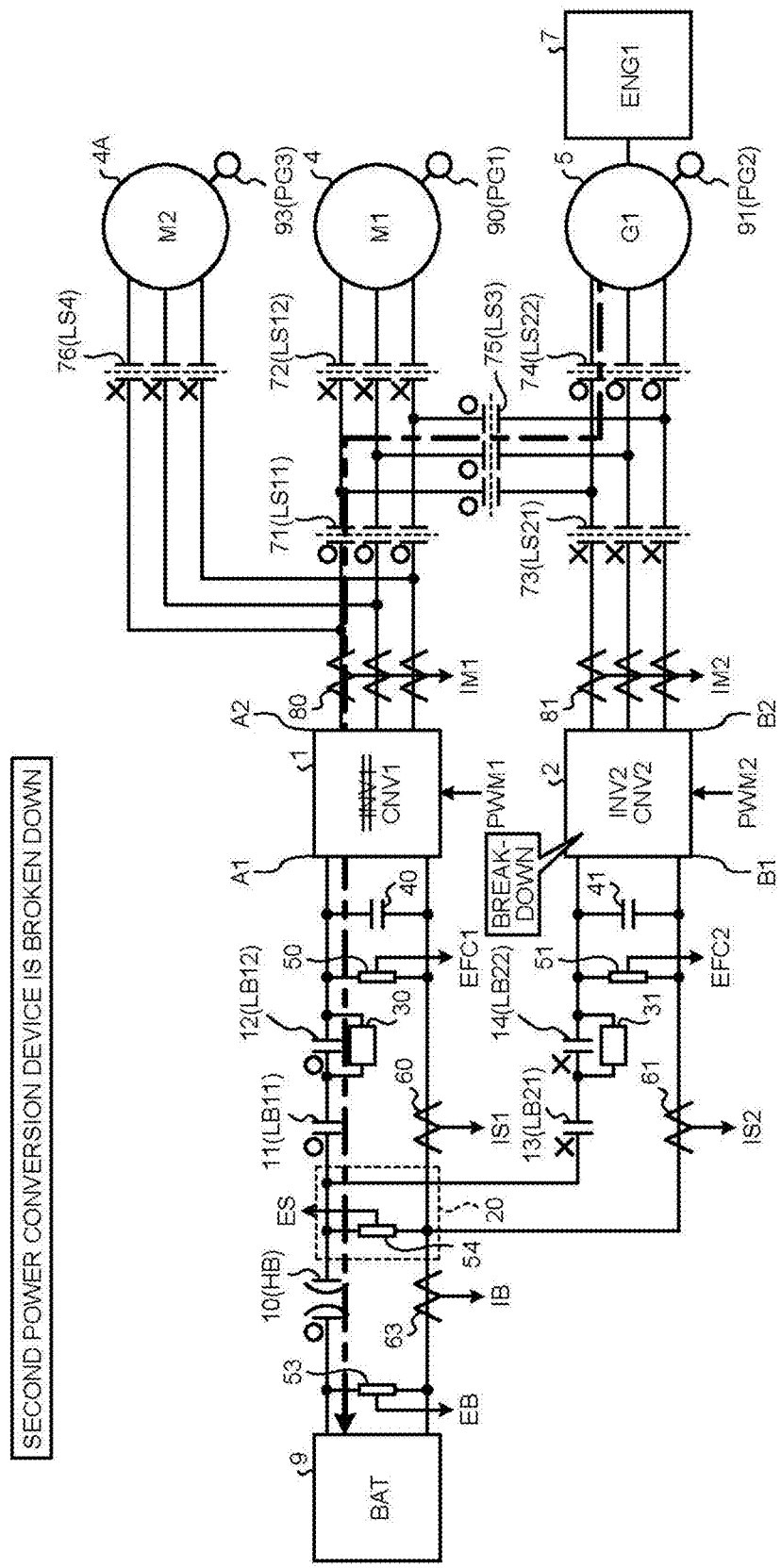
FIG. 9 is a diagram of states of the devices in the case of a breakdown of a second power converter.

FIG. 9 is a diagram of states of the devices in the case of a breakdown of the second power converter 2. When detecting a breakdown of the second power converter 2, as shown in FIG. 9, the control device 100 turns off the third line breaker 13, the fourth line breaker 14, and the third contactor 73. Consequently, the first input/output end B1 of the second power converter 2 is disconnected from the power storage device 9, and the second input/output end B2 of the second power converter 2 is disconnected from the generator 5.

In this case, if the SOC of the power storage device 9 is higher than the predetermined value, the control device 100 turns off the fifth contactor 75 and causes the first power converter 1 to operate as a DC/AC converter (INV1) to drive the first motor 4 and the second motor 4A using the stored power of the power storage device 9.

On the other hand, if the SOC of the power storage device 9 is lower than the predetermined value, the control device 100 stops the inverter operation of the first power converter 1 and further turns off the second contactor 72 and the sixth contactor 76. Consequently, the second input/output end A2 of the first power converter 1 is disconnected from the first motor 4 and the second motor 4A. Thereafter, the control device 100 turns on the fifth contactor 75 and causes the first power converter 1 to operate as an AC/DC converter (CNV1). In the first power converter 1, the generated power of the generator 5 is converted into direct-current power. The direct-current power is charged to the power storage device 9.

The inverter operation and the converter operation by the first power converter 1 are repeated, whereby, even when the second power converter 2 is broken down, the vehicle can shelter in the nearest station or the like without being stranded on the mainline and disturbing a schedule. Further, it is possible to drive the diesel engine 7 and cause the vehicle to travel until the volume of gas oil in the fuel tank (not shown in the figure) mounted on the vehicle reaches the lower limit.

Note that, in the first embodiment, an example is explained in which the two motors are controlled by the first power converter 1 as shown in, for example, FIG. 2. However, the propulsion control apparatus can be configured such that one motor is controlled by the first power converter 1 and the other motor is controlled by the second power converter 2. For example, according to a load of the vehicle or a route condition, the control device 100 turns on the sixth contactor 76, turns off the first contactor 71, turns on the second contactor 72, turns on the third contactor 73, turns off the fourth contactor 74, turns on the fifth contactor 75, causes the first power converter 1 to operate as a DC/AC converter (INV1), and causes the second power converter 2 to operate as a DC/AC converter (INV2). Therefore, the second motor 4A is controlled by the first power converter 1. The first motor 4 is controlled by the second power converter 2. According to this operation, compared with when a plurality of motors are driven by one power conversion device, because the motors can be individually controlled, it is possible to attain improvement of vehicle performance.

In the first embodiment, one first motor 4 and one second motor 4A are used. However, the number of the first motors 4 and the number of the second motors 4A are not limited to this. Each of the first motor 4 and the second motor 4A can be a plurality of motors. Further only one motor can be two or more motors. Note that, when two or more first power converters 1 are used, the first contactors 71 and the second contactors 72 are provided respectively between the first power converters 1 and the first motors 4. A plurality of the fifth contactors 75 are provided to correspond to the first motors 4.

As explained above, the propulsion control apparatus according to the first embodiment is configured to include the generator 5 driven by the diesel engine 7, the power storage device 9 functioning as a direct-current power supply source configured to be connectable to the direct-current common section 20, the first and second power converters 1 and 2 each of which is configured to be connectable to the direct-current common section 20, when direct-current power from the direct-current common section 20 is input from the first input/output end A1 side, operates as a DC/AC converter to output desired alternating-current power from the second input/output end sides A2 and B2 different from the first input/output ends A1 and B1, and, when alternating-current power is input from the second input/output ends A1 and B2 sides, operates as an AC/DC converter to output desired direct-current power from the first input/output ends A1 and B1 sides, the motors divided into the first motor 4 configured to be drivable by both of the first and second power converters and the second motor 4A configured to be drivable only by the first power converter 1, the group of switches (71, 72, 73, 74, and 75) that switches an electric connection destination of the generator 5 from the second input/output end 2B side of the second power converter 2 to the second input/output end A2 side of the first power converter 1 or switches an electric connection destination of the first motor 4 from the second input/output end A2 side of the first power converter 1 to the second input/output end B2 side of the second power converter 2, and the control unit (the control device 100) that controls, according to operation forms of the first and second power converters 1 and 2, the operations of the first power converter 1, the second power converter 2, and the group of switches. With this configuration, connection states of the motors and the first power converter 1 and the second power converter 2 are controlled. One motor is driven by the first power converter 1 and the other motor is driven by the second power converter 2. As a result, it is made possible to attain further improvement of efficiency of the railroad vehicle even in a configuration in which the motors (4 and 4A) are controlled by one power conversion device (1). Further, compared with when a plurality of motors are driven by one power conversion device, because the motors can be individually controlled, it is possible to attain improvement of vehicle performance.

The control device 100 according to the first embodiment is configured to, when the first power converter 1 is broken down, if the SOC of the power storage device 9 is lower than the predetermined value, cause the second power converter 2 to operate as a DC/AC converter and supply alternating-current power from the second power converter 2 to the generator 5 and, after the diesel engine 7 starts, cause the second power converter 2 to operate as an AC/DC converter and supply direct-current power from the second power converter 2 to the power storage device 9, and, if the SOC of the power storage device 9 is higher than the predetermined value, cause the second power converter 2 to operate as a DC/AC converter and supply alternating-current power from the second power converter 2 to the first motor 4. Therefore, the inverter operation and the converter operation by the second power converter 2 are repeated. Even when the first power converter 1 is broken down, the vehicle can shelter in the nearest station or the like without being stranded on the mainline and disturbing a schedule. Further, it is made possible to drive the diesel engine 7 and cause the vehicle to travel until the volume of gas oil in the fuel tank (not shown in the figure) mounted on the vehicle reaches the lower limit.

The control device 100 according to the first embodiment is configured to, when the second power converter 2 is broken down, if the SOC of the power storage device 9 is lower than the predetermined value, cause the first power converter 1 to operate as a DC/AC converter and supply alternating-current power from the first power converter 1 to the generator 5 and, after the diesel engine 7 starts, cause the first power converter 1 to operate as an AC/DC converter and supply direct-current power from the first power converter 1 to the power storage device 9, and, if the SOC of the power storage device 9 is higher than the predetermined value, cause the first power converter 1 to operate as a DC/AC converter and supply alternating-current power from the first power converter 1 to the first motor 4. Therefore, the inverter operation and the converter operation by the first power converter 1 are repeated. Even when the second power converter 2 is broken down, the vehicle can shelter in the nearest station or the like without being stranded on the mainline and disturbing a schedule. Further, it is made possible to drive the diesel engine 7 and cause the vehicle to travel until the volume of gas oil in the fuel tank (not shown in the figure) mounted on the vehicle reaches the lower limit.

Second Embodiment

Figure 10:
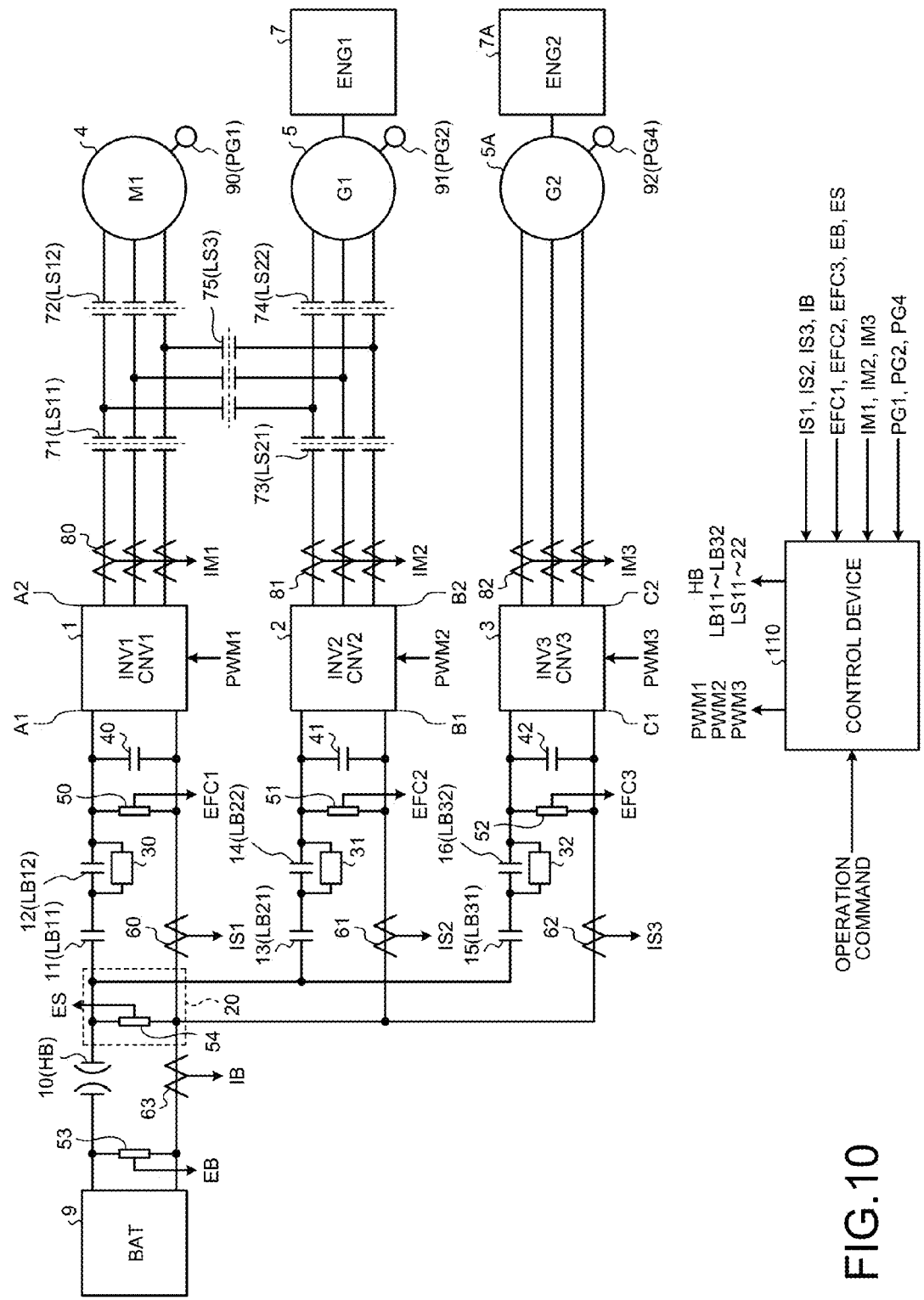
FIG. 10 is a configuration diagram of a propulsion control apparatus according to a second embodiment of the present invention.

FIG. 10 is a configuration diagram of a propulsion control apparatus according to a second embodiment of the present invention. The second embodiment is different from the first embodiment in that a third power converter 3 connected to the direct-current common section 20, a generator 5A connected to the third power converter 3, and a diesel engine 7A connected to the generator 5A are added, and in that a control device 110 is used instead of the control device 100. In the following explanation, components same as the components in the first embodiment are denoted by the same reference numerals and signs and explanation of the components is omitted. Only different components are explained.

The propulsion control apparatus according to the second embodiment is configured by including, as main components, the first motor 4, the second motor 4A, the diesel engine 7, the generator 5, the diesel engine 7A, the generator 5A, the control device 110, the first power converter 1, the second power converter 2, the third power converter 3, and the power storage device 9. In FIG. 10, the second motor 4A is not shown to simplify explanation. However, the second motor 4A can be provided as in the first embodiment or the propulsion control apparatus can be configured by omitting the second motor 4A.

Two diesel engines 7 and 7A are used in the propulsion control apparatus according to the second embodiment. The diesel engine 7A is connected to the generator 5A, which is one of power supply sources that generate electric power. The generator 5A is an alternating-current generator driven by the diesel engine 7A. The generator 5A is supplied with alternating-current power by the third power converter 3 and operates as an alternating-current electric motor as well.

The third power converter 3 operates as an AC/DC converter or a DC/AC converter. When the third power converter 3 operates as an AC/DC converter, alternating-current power generated by the generator 5A is supplied to a second input/output end C2 side located on the generator 5A side of the third power converter 3. In the third power converter 3, the alternating-current power is converted into direct-current power. The direct-current power is charged to the power storage device 9.

When the third power converter 3 operates as a DC/AC converter, direct-current power from the power storage device 9 is supplied to a first input/output end C1 side located on the direct-current common section 20 side of the third power converter 3. In the third power converter 3, the direct-current power is converted into alternating-current power. The alternating-current power is supplied to the generator 5A and the generator 5A is driven.

A fifth line breaker 15 and a sixth line breaker 16 are connected in series and inserted between the direct-current common section 20 and the third power converter 3. A fifth voltage detector 52 detects a voltage EFC3 of a third filter capacitor 42. A fourth current detector 62 detects a direct current IS3 flowing into and out of the third power converter 3. A sixth current detector 82 detects an alternating current IM3 flowing into and out of the third power converter 3. A fourth speed detector 92 detects rotating speed (generator rotating speed) PG4 of the generator 5A. Detection values detected by the sensors are input to the control device 110. Note that, besides the detection values, values equivalent to the detection values input to the control device 100 in the first embodiment are input to the control device 110. Further, an operation command from a not-shown motorman's platform is also input to the control device 110.

The control device 110 switches an operation mode of the vehicle according to the operation command and generates, on the basis of the detection values from the various sensors, signals (PWM1, PWM2, and PWM3) for controlling not-shown switching elements of the power converters, a signal (HB) for controlling ON/OFF of the high-speed breaker 10, signals (LB11 to 32) for controlling ON/OFF of the line breakers, and signals (LS11 to 22) for controlling ON/OFF of the contactors and outputs the signals to the respective control target sections. Answerbacks from the devices are input to the control device 110.

Note that, in FIG. 10, the diesel engine 7A and the generator 5A are respectively represented as "ENG2" and "G2". The third power converter 3 is represented focusing on functions thereof. For example, when the third power converter 3 operates as an AC/DC converter, the third power converter 3 is represented as "CNV3". When the third power converter 3 operates as a DC/AC converter, the third power converter 3 is represented as "INV3".

Operations in respective modes in the propulsion control apparatus according to the second embodiment are explained.

Figure 11:
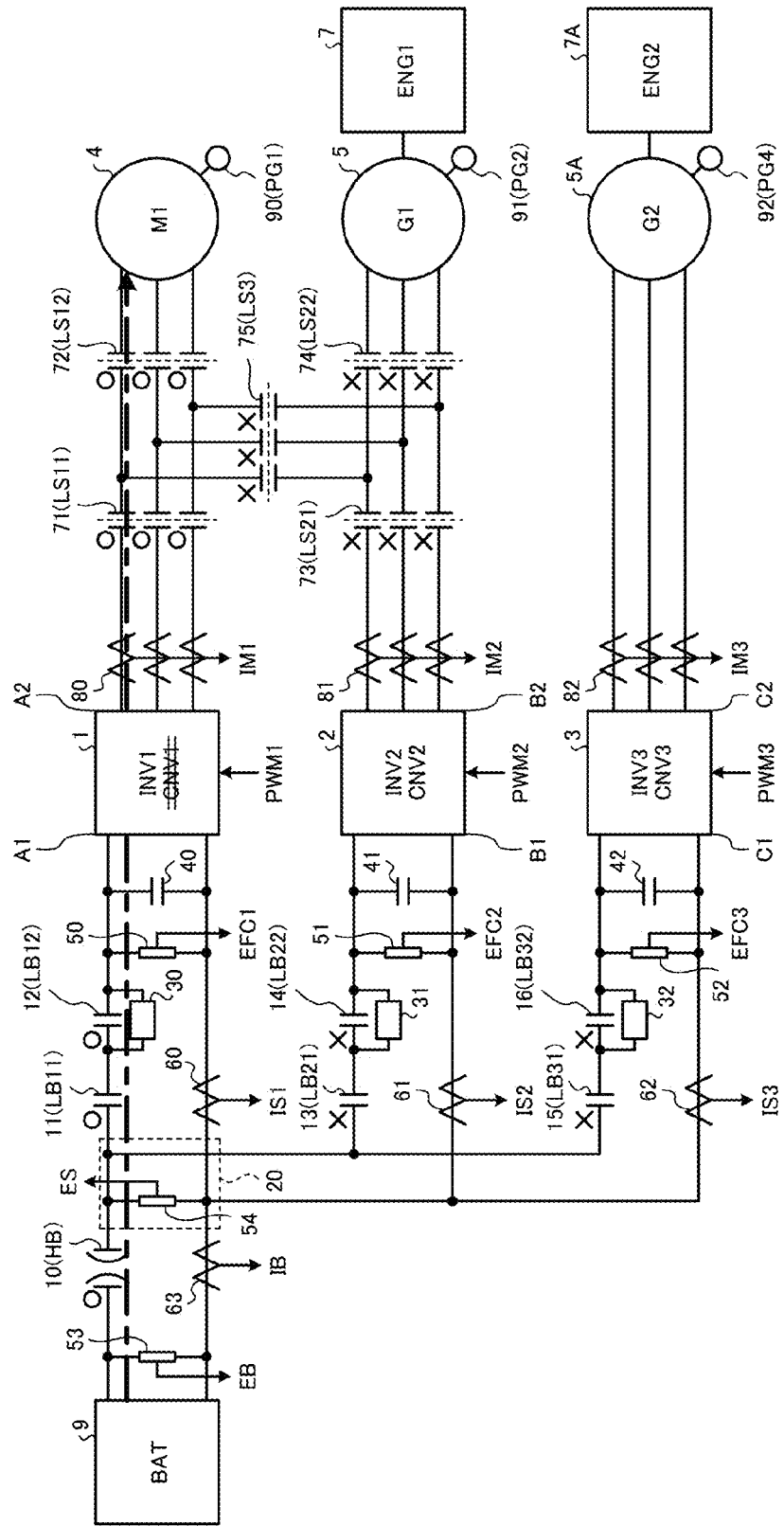
FIG. 11 is a diagram of states of devices during departure.

FIG. 11 is a diagram of states of the devices during the departure of the vehicle. When an operation command indicating departure is input to the control device 110, to reduce noise of the diesel engine 7 and the diesel engine 7A, the control device 110 causes the first power converter 1 to perform an inverter operation. In the first power converter 1, direct-current power from the power storage device 9 is converted into the alternating-current power. The first motor 4 is driven by the alternating current power.

More specifically, when confirming that the voltage EB of the power storage device 9 is a voltage in a normal range, the control device 110 turns on the high-speed breaker 10. When confirming that the voltage ES of the direct-current common section 20 is a voltage in a normal range, the control device 110 turns on the first line breaker 11. The first filter capacitor 40 is charged while an electric current is limited by the first charging resistor 30. When detecting with the first voltage detector 50 that the first filter capacitor 40 has been charged to a predetermined voltage, the control device 110 turns on the second line breaker 12 and short-circuits the first charging resistor 30. The control device 110 confirms that the fifth contactor 75 is off and turns on the first contactor 71, turns on the second contactor 72, turns off the third contactor 73, and turns off the fourth contactor 74. The control device 110 causes the first power converter 1 to operate as a DC/AC converter (INV1). In the power converter 1, direct-current power from the power storage device 9 is converted into alternating-current power, and the first motor 4 is driven by the alternating-current power and the vehicle travels. Note that the other devices are set in an OFF state. According to this operation, the first motor 4 is driven using stored power of the power storage device 9. Therefore, it is made possible to reduce the noise of the diesel engines 7 and 7A.

Figure 12:
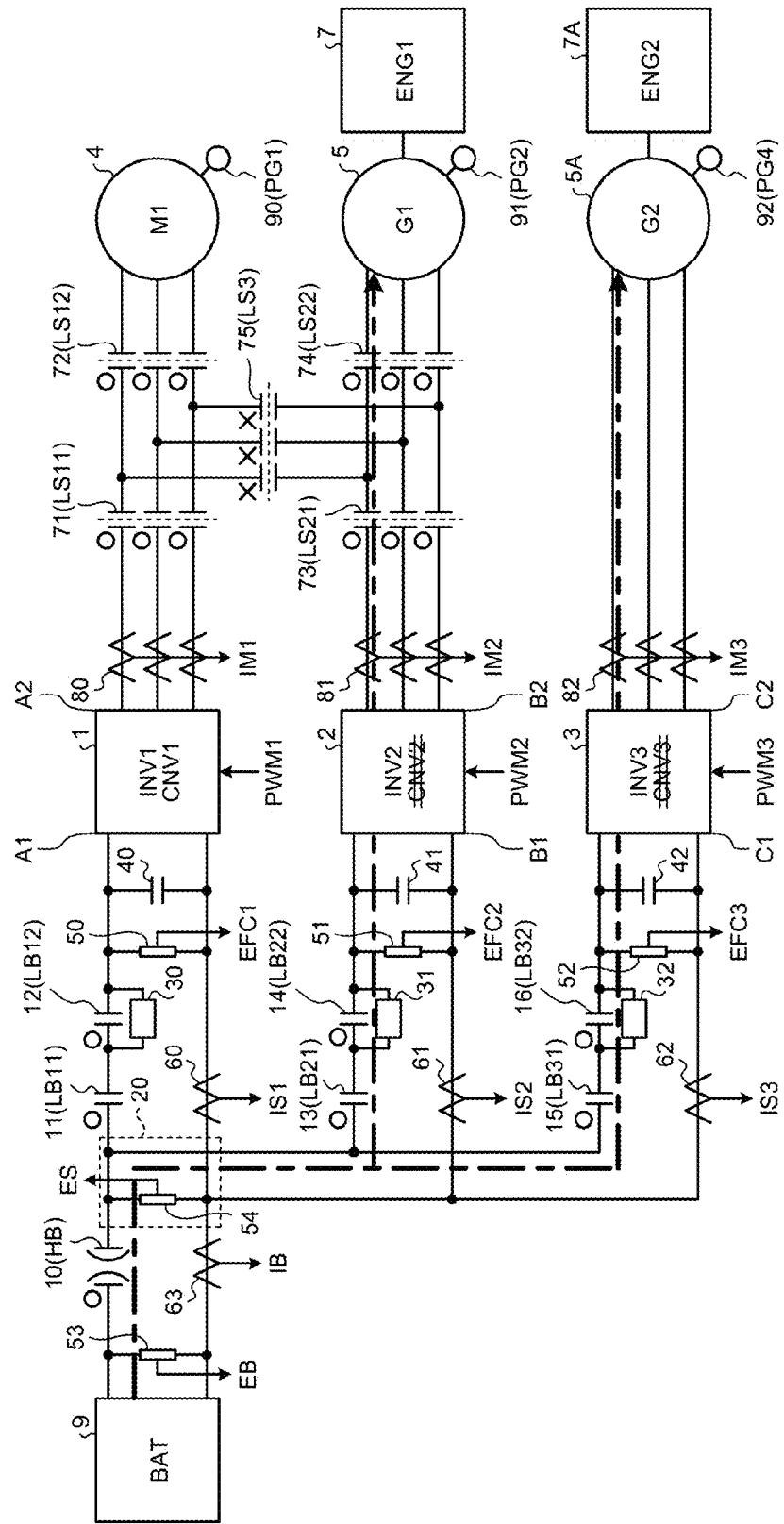
FIG. 12 is a diagram of an operation in performing an engine start using stored power of a power storage device.

FIG. 12 is a diagram of an operation in starting the diesel engines 7 and 7A using the stored power of the power storage device 9. When the hybrid railroad vehicle reaches predetermined speed (or a predetermined travel distance, a predetermined time, or it can be an operation of a motorman, or a command from a railroad system), the control device 110 turns on the third line breaker 13 and charges the second filter capacitor 41 while limiting an electric current with the second charging resistor 31. When confirming with the voltage detected by the second voltage detector 51 that the second filter capacitor 41 has been charged to a predetermined voltage, the control device 110 turns on the fourth line breaker 14 and short-circuits the second charging resistor 31. The control device 110 confirms that the fifth contactor 75 is off and turns on the third contactor 73 and turns on the fourth contactor 74. The control device 110 causes the second power converter 2 to operate as a DC/AC converter (INV2). In the second power converter 2, direct-current power from the power storage device 9 is converted into alternating-current power. The generator 5 is caused to operate as a motor by the alternating-current power to start the diesel engine 7.

Similarly, the control device 110 turns on the fifth line breaker 15 and charges the third filter capacitor 42 while limiting an electric current with a third charging resistor 32. When confirming with the voltage detected by the fifth voltage detector 52 that the third filter capacitor 42 has been charged to a predetermined voltage, the control device 110 turns on the sixth line breaker 16 and short-circuits the third charging resistor 32. The control device 110 causes the third power converter 3 to operate as a DC/AC converter (INV3). In the third power converter 3, direct-current power from the power storage device 9 is converted into alternating-current power, and the generator 5A is caused to operate as a motor by the alternating-current power to start the diesel engine 7A.

Note that, in the propulsion control apparatus according to the second embodiment, by shifting start timings of the diesel engine 7 and the diesel engine 7A, it is possible to reduce the maximum of discharge power from the power storage device 9, suppress deterioration of the power storage device 9, and extend the life of the power storage device 9. For example, the propulsion control apparatus can be configured to start the diesel engine 7A after the control device 110 confirms that the diesel engine 7 has started. If the propulsion control apparatus is configured in this way, depending on a peripheral situation of the vehicle, for example, when the vehicle is present in the vicinity of a place crowded with people such as a station, it is possible to reduce the influence due to the noise of the diesel engines 7 and 7A. Note that whichever of the two diesel engines 7 and 7A can be started first.

Figure 13:
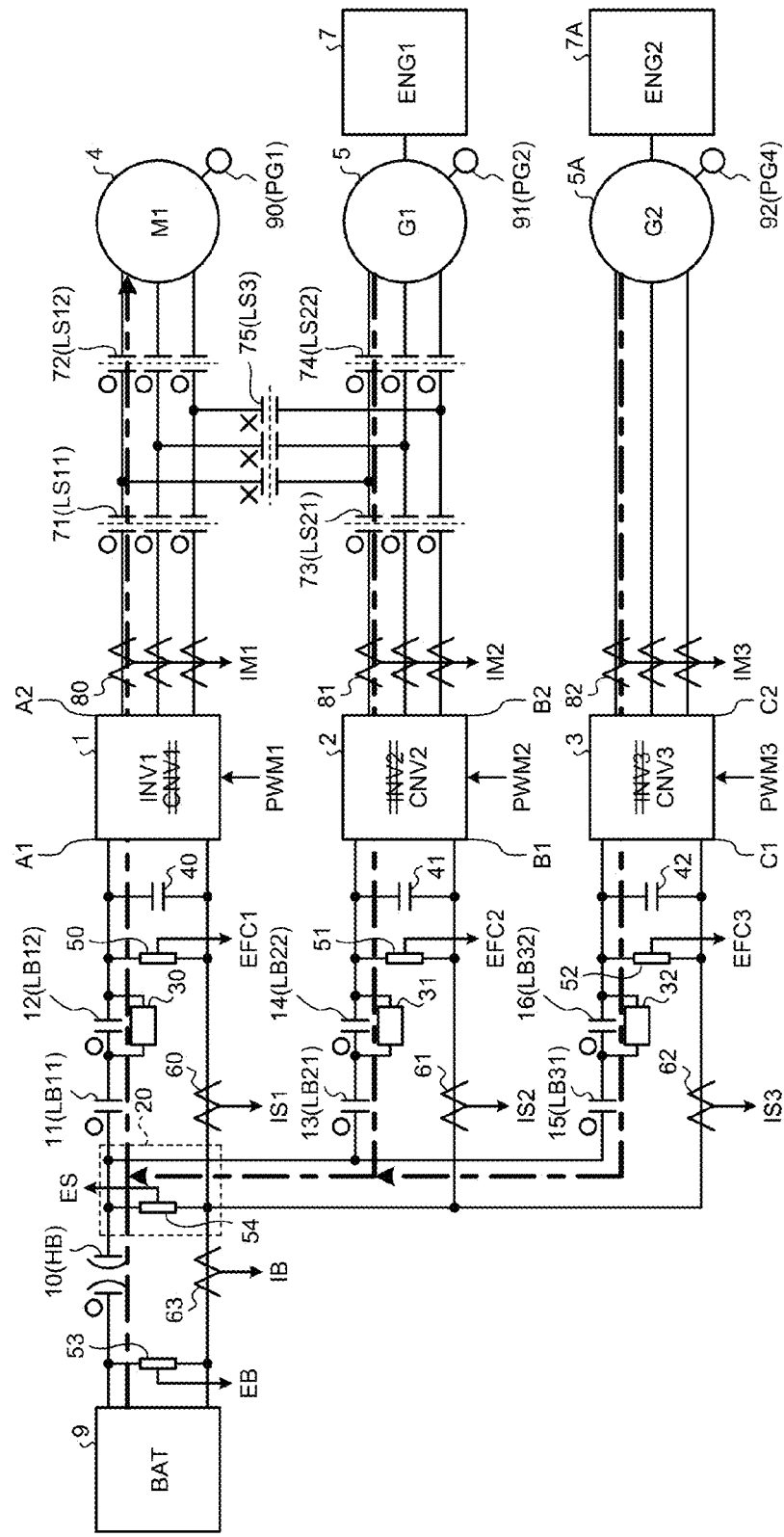
FIG. 13 is a diagram of an operation in driving a first motor using generated power of generators and the stored power of the power storage device.

FIG. 13 is a diagram of an operation in driving the first motor 4 using generated power of the generators and the stored power of the power storage device 9. When the diesel engine 7 is started by the operation shown in FIG. 12, after once stopping the inverter operation of the second power converter 2, the control device 110 causes the second power converter 2 to restart as an AC/DC converter (CNV2). Similarly, after once stopping the inverter operation of the third power converter 3, the control device 110 causes the third power converter 3 to restart as an AC/DC converter (CNV3). The control device 110 causes the first power converter 1 to operate as a DC/AC converter (INV1). In the first power converter 1, direct-current power from the power storage device 9, the second power converter 2, and from the third power converter 3 is converted into alternating-current power. The first motor 4 is driven by the alternating-current power and the vehicle accelerates.

Figure 14:
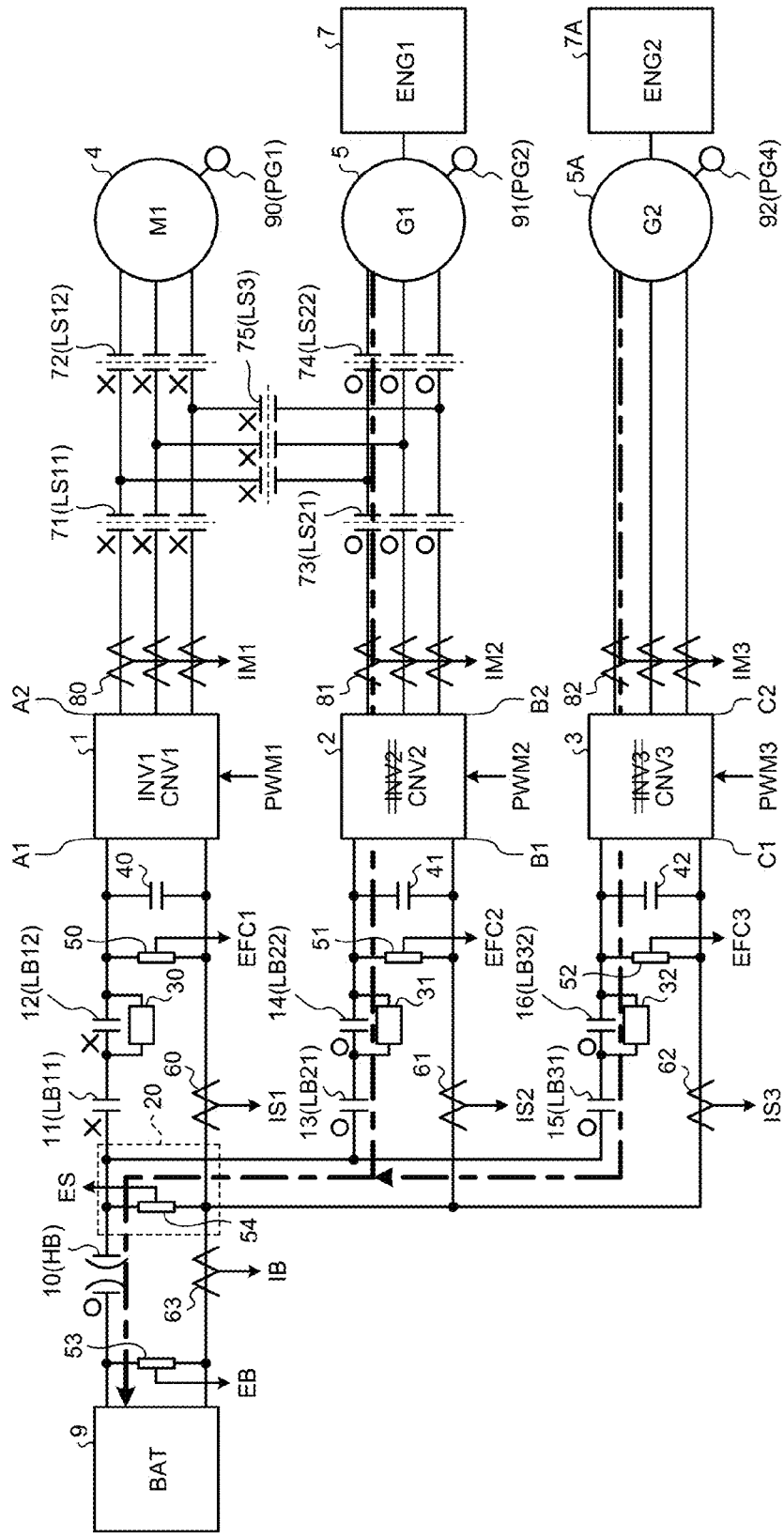
FIG. 14 is a diagram of states of the devices during coasting.

FIG. 14 is a diagram of states of the devices during coasting. When a power running command from the motorman's platform is turned off, the control device 110 stops the inverter operation of the first power converter 1 and turns off the first line breaker 11 and turns off the second line breaker 12. In this case, when a state of charge (SOC) of the power storage device 9 is low, the power generation of the generator 5 driven by the diesel engine 7 is continued. The generated power is converted into direct-current power and charged to the power storage device 9 by the second power converter 2. Similarly, the power generation of the generator 5A driven by the diesel engine 7A is continued. The generated power is converted into direct-current power and charged to the power storage device 9 by the third power converter 3. Depending on a value of the SOC of the power storage device 9, any one of the diesel engines 7 and 7A can be stopped to reduce total generated power, and thus it is made possible to reduce the noise of the diesel engines.

Figure 15:
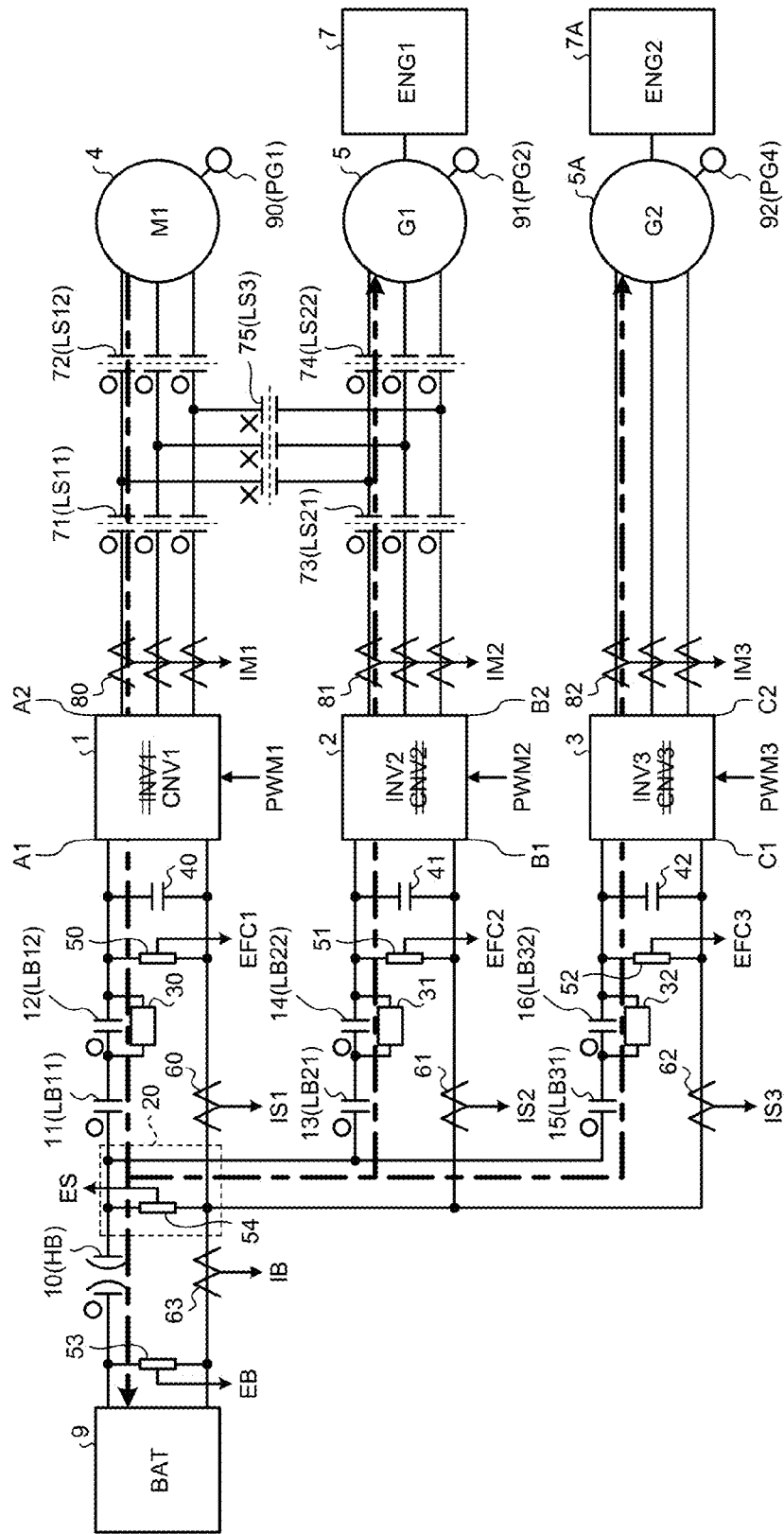
FIG. 15 is a diagram of states of the devices during braking.

FIG. 15 is a diagram of states of the devices during braking. During the braking, the control device 110 causes the first motor 4 to operate as a generator. Regenerative electric power from the first motor 4 is input to the first power converter 1. The control device 110 causes the first power converter 1 to operate as an AC/DC converter (CNV1). The first power converter 1 converts the regenerative electric power from the first motor 4 into direct-current power and charges the power storage device 9.

In this case, if the SOC of the power storage device 9 is lower than a predetermined value in a case in which the power storage device 9 is charged only by the regenerative electric power, the control device 110 drives the diesel engine 7. The generated power from the generator 5 is input to the second power converter 2. The control device 110 causes the second power converter 2 to operate as an AC/DC converter (CNV2). The second power converter 2 converts the generated power from the generator 5 into direct-current power and charges the power storage device 9. Similarly, the control device 110 drives the diesel engine 7A. The generated power from the generator 5A is input to the third power converter 3. The control device 110 causes the third power converter 3 to operate as an AC/DC converter (CNV3). The third power converter 3 converts the generated power from the generator 5A into direct-current power and charges the power storage device 9.

On the other hand, if the SOC of the power storage device 9 is higher than the predetermined value or if the power storage device 9 cannot be charged, the control device 110 causes the second power converter 2 to operate as a DC/AC converter (INV2). Direct-current power from the first power converter 1 is input to the second power converter 2. The second power converter 2 converts the direct-current power into alternating-current power and causes the generator 5 to operate as a motor. The second power converter 2 causes the diesel engine 7 to operate as an engine brake (further as an exhaust brake) and consume electric power. Similarly, the control device 110 causes the third power converter 3 to operate as a DC/AC converter (INV3). Direct-current power from the first power converter 1 is input to the third power converter 3. The third power converter 3 converts the direct-current power into alternating-current power and causes the generator 5A to operate as a motor. The third power converter 3 causes the diesel engine 7A to operate as an engine brake (further as an exhaust brake) and consume electric power. Note that, in FIG. 15, to simplify explanation, a state in the case in which the SOC of the power storage device 9 is higher than the predetermined value is shown.

According to the operation shown in FIG. 15, it is possible to continue the regenerative brake and suppress wear of brake shoes. Therefore, it is possible to suppress odor involved in the wear of the brake shoes. The life of the brake shoes is extended and a replacement cycle of the brake shoes is extended. It is possible to reduce costs. The propulsion control apparatus according to the second embodiment can be configured to cause only any one of the diesel engines 7 and 7A to operate as the engine brake. If the propulsion control apparatus is configured in this way, it is possible to reduce the noise of the diesel engines 7 and 7A.

Figure 16:
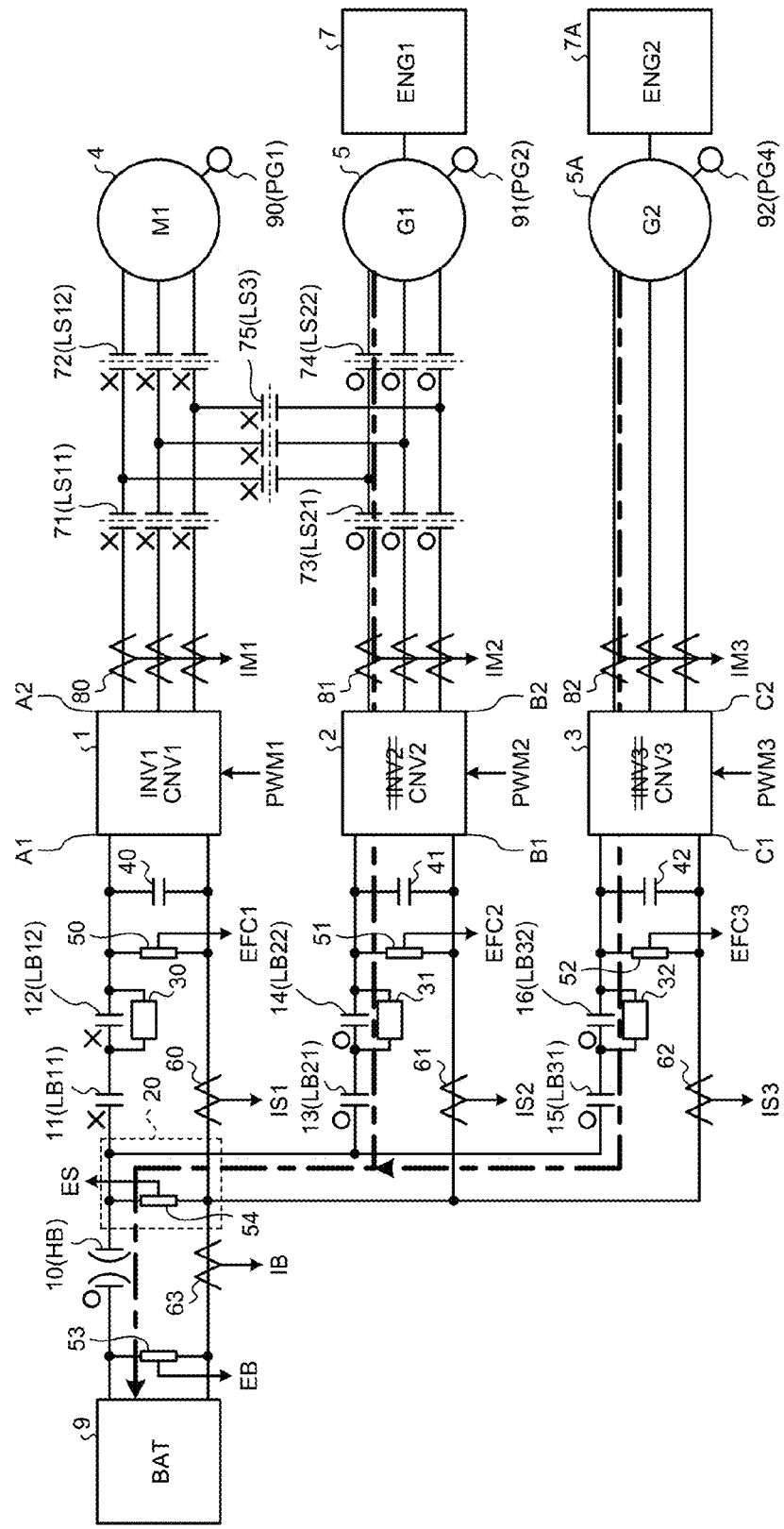
FIG. 16 is a diagram of states of the devices during a stop.

FIG. 16 is a diagram of states of the devices during the stopped state of the vehicle. When the vehicle is stopped, for example, if power consumption in the vehicle by not-shown auxiliary power supply devices is large or if the SOC of the power storage device 9 is lower than the predetermined value, the control device 110 drives the diesel engine 7. The generated power from the generator 5 is input to the second power converter 2. The control device 110 causes the second power converter 2 to operate as an AC/DC converter (CNV2). The second power converter 2 converts the generated power from the generator 5 into direct-current power and charges the power storage device 9.

Similarly, for example, if the SOC of the power storage device 9 is lower than the predetermined value, the control device 110 drives the diesel engine 7A. The generated power from the generator 5A is input to the third power converter 3. The control device 110 causes the third power converter 3 to operate as an AC/DC converter (CNV3). The third power converter 3 converts the generated power from the generator 5A into direct-current power and charges the power storage device 9.

When the SOC of the power storage device 9 is high or when the power consumption in the vehicle by the not-shown auxiliary power supply devices is small, the control device 110 stops the diesel engine 7 or the diesel engine 7A. Consequently, it is possible to reduce noise and suppress fuel consumption.

Figure 17:
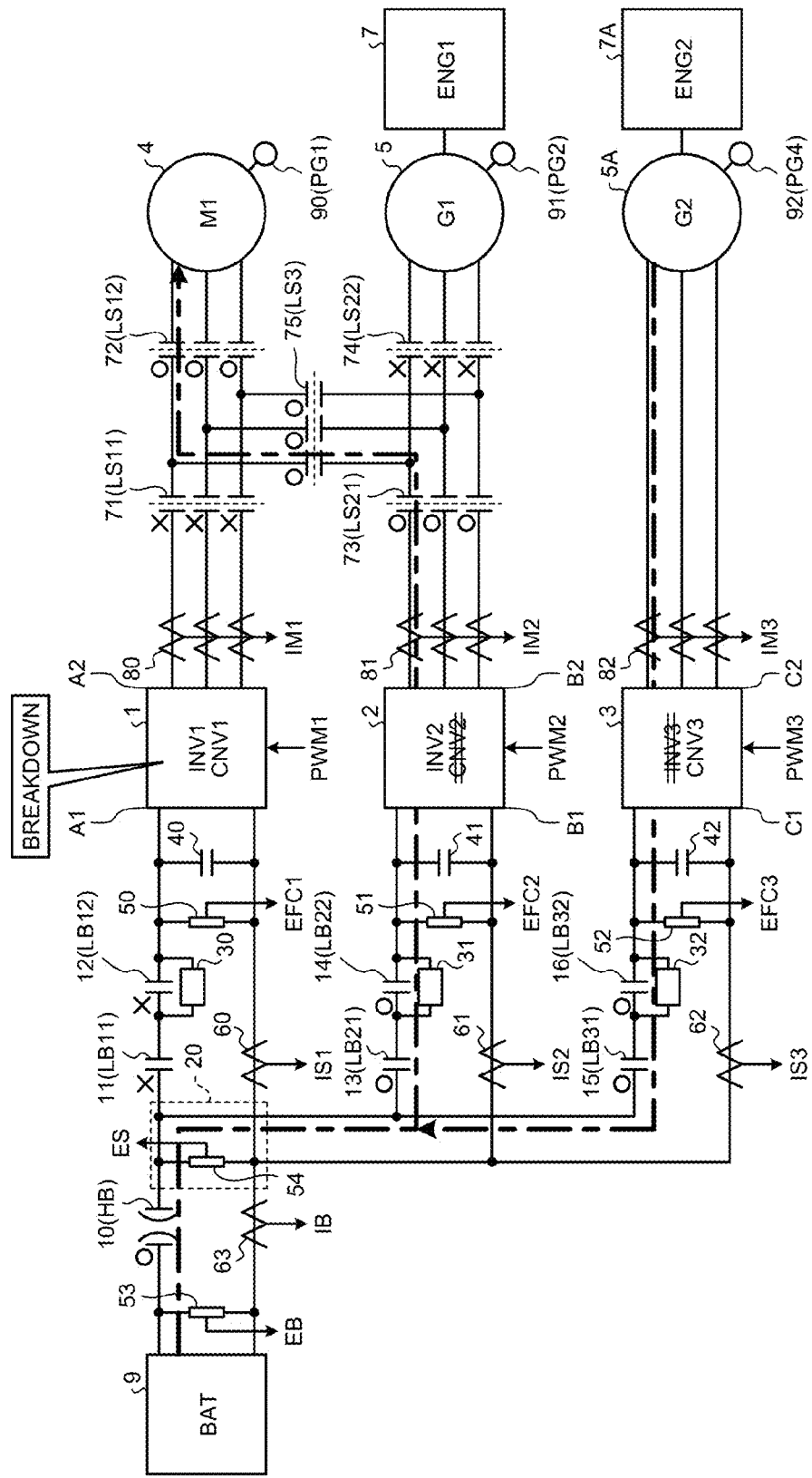
FIG. 17 is a diagram of states of the devices in the case of a breakdown of a first power converter.

FIG. 17 is a diagram of states of the devices in the case of a breakdown of the first power converter 1. When detecting a breakdown of the first power converter 1, first, the control device 110 turns off the first line breaker 11, the second line breaker 12, and the first contactor 71. Consequently, the first input/output end A1 of the first power converter 1 is disconnected from the power storage device 9. The second input/output end A2 of the first power converter 1 is disconnected from the first motor 4.

Subsequently, the control device 110 stops the converter operation of the second power converter 2 and further turns off the fourth contactor 74. Consequently, the second input/output end B2 of the second power converter 2 is disconnected from the generator 5. Thereafter, the control device 110 turns on the fifth contactor 75 and causes the second power converter 2 to operate as a DC/AC converter (INV2). The control device 110 causes the third power converter 3 to operate as an AC/DC converter (CNV3). Consequently, direct-current power converted by the third power converter 3 is supplied to the second power converter 2. The second power converter 2 converts the direct-current power from the power storage device 9 and the third power converter 3 into alternating-current power and drives the first motor 4.

As explained above, in the propulsion control apparatus according to the second embodiment, even when the first power converter 1 is broken down, it is possible to cause the second power converter 2 to perform the inverter operation and cause the third power converter 3 to perform the converter operation. Therefore, it is possible to drive the diesel engine 7A and cause the vehicle to travel until the volume of gas oil in a fuel tank mounted on the vehicle reaches the lower limit. It is possible to continuously drive the first motor 4 and increase vehicle speed or increase a travel distance compared with the first embodiment.

Figure 18:
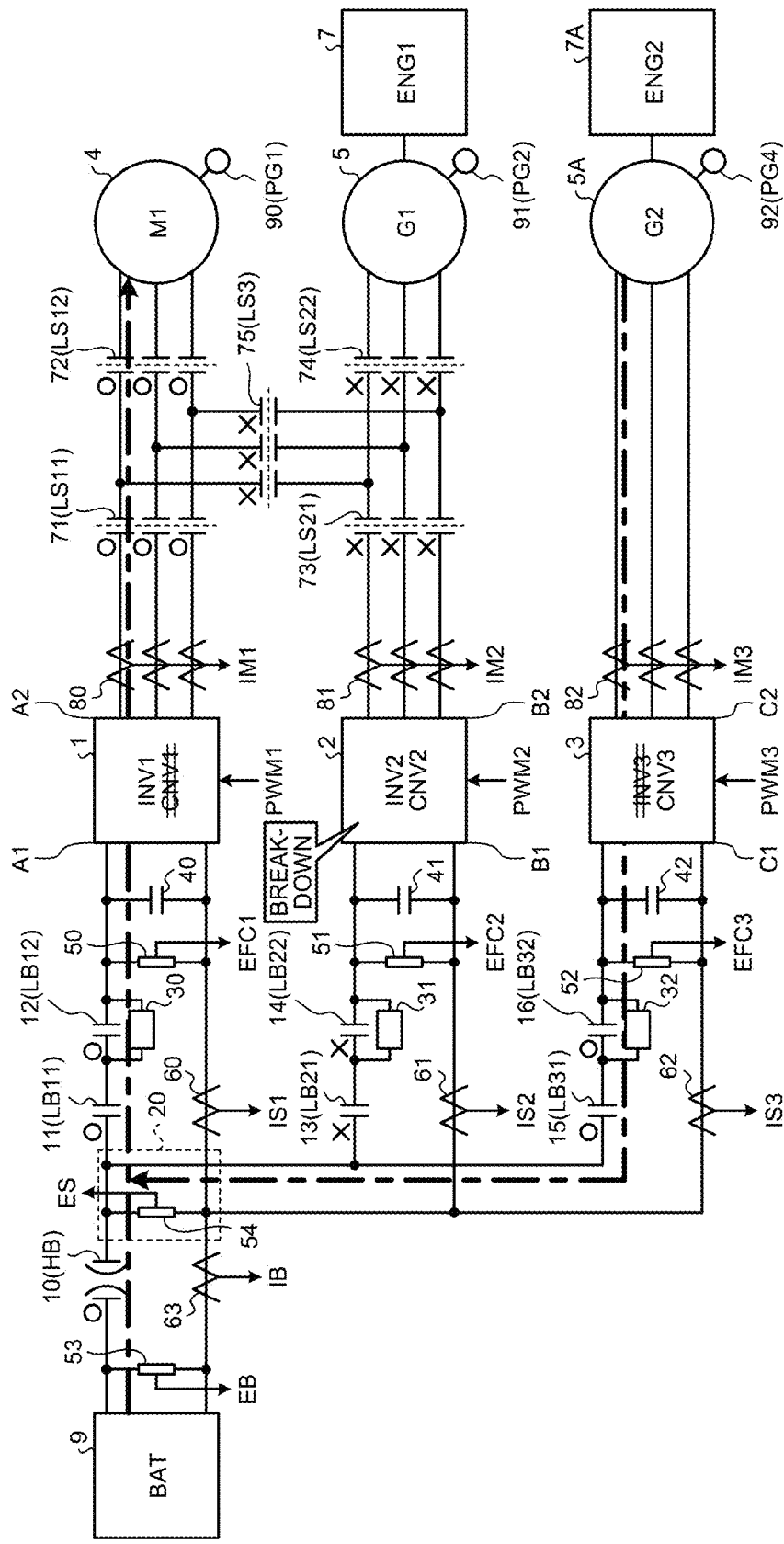
FIG. 18 is a diagram of states of the devices in the case of a breakdown of a second power converter.

FIG. 18 is a diagram of states of the devices in the case of a breakdown of the second power converter 2. When detecting a breakdown of the second power converter 2, as shown in FIG. 18, the control device 110 turns off the third line breaker 13, the fourth line breaker 14, and the third contactor 73. Consequently, the first input/output end B1 of the second power converter 2 is disconnected from the power storage device 9. The second input/output end B2 of the second power converter 2 is disconnected from the generator 5.

In this case, if the SOC of the power storage device 9 is higher than the predetermined value, the control device 110 turns off the fifth contactor 75, causes the first power converter 1 to operate as a DC/AC converter (INV1), and causes the third power converter 3 to operate as an AC/DC converter (CNV3). Consequently, direct-current power converted by the third power converter 3 is supplied to the first power converter 1. The first power converter 1 converts the direct-current power from the power storage device 9 and the third power converter 3 into alternating-current power and drives the first motor 4.

As explained above, in the propulsion control apparatus according to the second embodiment, even when the second power converter 2 is broken down, it is possible to cause the first power converter 1 to perform the inverter operation and cause the third power converter 3 to perform the converter operation. Therefore, it is possible to drive the diesel engine 7A and cause the vehicle to travel until the volume of gas oil in the fuel tank (not shown in the figure) mounted on the vehicle reaches the lower limit. It is possible to continuously drive the first motor 4. Therefore, it is possible to increase vehicle speed or increase a travel distance compared with the first embodiment.

FIG. 19 is a diagram of states of the devices in the case of a breakdown of the third power converter 3. When detecting a breakdown of the third power converter 3, as shown in FIG. 19, the control device 110 turns off the fifth line breaker 15 and the sixth line breaker 16. Consequently, the first input/output end C1 of the third power converter 3 is disconnected from the power storage device 9. The second input/output end C2 of the third power converter 3 is disconnected from the generator 5A.

In this case, if the SOC of the power storage device 9 is higher than the predetermined value, the control device 110 turns off the fifth contactor 75, causes the first power converter 1 to operate as a DC/AC converter (INV1), and causes the second power converter 2 to operate as an AC/DC converter (CNV2). Consequently, direct-current power converted by the second power converter 2 is supplied to the first power converter 1. The first power converter 1 converts the direct-current power from the power storage device 9 and the second power converter 2 into alternating-current power and drives the first motor 4.

As explained above, in the propulsion control apparatus according to the second embodiment, even when the third power converter 3 is broken down, it is possible to cause the first power converter 1 to perform the inverter operation and cause the second power converter 2 to perform the converter operation. Therefore, it is possible to drive the diesel engine 7 and cause the vehicle to travel until the volume of gas oil in the fuel tank (not shown in the figure) mounted on the vehicle reaches the lower limit. It is possible to continuously drive the first motor 4. Therefore, it is possible to increase vehicle speed or increase a travel distance compared with the first embodiment.

As explained above, in the propulsion control apparatus according to the second embodiment, the generator is divided into the first generator (5) and the second generator (5A) respectively driven by the first engine (7) and the second engine (7A). The propulsion control apparatus includes the third power converter 3 that is configured to be connectable to the direct-current common section 20 and, when direct-current power from the direct-current common section 20 is input from the first input/output end C1 side, operates as a DC/AC converter, outputs desired alternating-current power from the second input/output end C2 side different from the first input/output end C1, and supplies the desired alternating-current power to the second generator 5A, and, when alternating-current power from the second generator 5A is input from the second input/output end C2 side, operates as an AC/DC converter and outputs desired direct-current power from the first input/output end C1 side. The control device 110 is configured to, when the first power converter 1 is broken down, cause the third power converter 3 to operate as a DC/AC converter and supply alternating-current power from the third power converter 3 to the second generator 5A and, after the generator 5A starts, cause the third power converter 3 to operate as an AC/DC converter and supply direct-current power from the third power converter 3 to the direct-current common section 20. Therefore, even when the first power converter 1 is broken down, it is possible to cause the second power converter 2 to perform the inverter operation and cause the third power converter 3 to perform the converter operation. It is possible to drive the diesel engine and cause the vehicle to travel until the volume of gas oil in the fuel tank (not shown in the figure) mounted on the vehicle reaches the lower limit. It is possible to increase vehicle speed or increase a travel distance compared with the first embodiment.

The control device 110 according to the second embodiment is configured to, when the second power converter 2 is broken down, if the SOC of the power storage device 9 is lower than the predetermined value, cause the third power converter 3 to operate as a DC/AC converter and supply alternating-current power from the third power converter 3 to the second generator and, after the second engine (7A) starts, cause the third power converter 3 to operate as an AC/DC converter and supply direct-current power from the third power converter 3 to the direct-current common section 20. Therefore, even when the second power converter 2 is broken down, it is possible to cause the first power converter 1 to perform the inverter operation and cause the third power converter 3 to perform the converter operation. It is possible to drive the diesel engine and cause the vehicle to travel until the volume of gas oil in the fuel tank (not shown in the figure) mounted on the vehicle reaches the lower limit. It is possible to increase vehicle speed or increase a travel distance compared with the first embodiment.

Note that, in the first and second embodiments, the first motor 4 and the second motor 4A are used. However, the same effects can be obtained when only the first motor 4 is used. That is, the propulsion control apparatuses according to the first and second embodiments are configured to include the motor configured to be drivable by the first power converter 1, the group of switches (71, 72, 73, 74, and 75) that switches an electric connection destination of the generator 5 from the second input/output end B2 side of the second power converter 2 to the second input/output end A2 side of the first power converter 1 or switches an electric connection destination of the motor 4 from the second input/output end A2 side of the first power converter 1 to the second input/output end B2 side of the second power converter 2, and the control units (the control devices 100 and 110) that control, according to operation forms of the first and second power converters 1 and 2, the operations of the first power converter 1, the second power converter 2, and the group of switches. With this configuration, connection states between the motor 4 and the first power converter 1 and the second power converter 2 are controlled, and the motor 4 is driven by the first power converter 1 or the second power converter 2.

The first input/output end side explained in the first and second embodiments represents, for example, when a switching element is connected in series, a terminal side to which a plurality of the switching elements connected in series are connected in parallel. The second input/output end side represents, when a switching element is connected in series, a terminal side of a point of the series connection.

The propulsion control apparatuses of the engine hybrid railroad vehicle explained in the embodiments indicate an example of contents of the present invention. It goes without saying that the propulsion control apparatuses can be combined with still other publicly-known technologies and can be configured to be changed to, for example, omit a part thereof in a range not departing from the spirit of the present invention.

INDUSTRIAL APPLICABILITY

As explained above, the present invention is applicable to the propulsion control apparatus of the engine hybrid railroad vehicle. In particular, the present invention is useful as an invention that can attain further improvement of efficiency of a railroad vehicle even in a configuration in which a plurality of motors are driven by one power conversion device.

REFERENCE SIGNS LIST

1 First power converter
2 Second power converter
3 Third power converter
4 First motor
4A Second motor
5 Generator (First generator)
5A Generator (Second generator)
7 Diesel engine (First engine)
7A Diesel engine (Second engine)
9 Power storage device
10 High-speed breaker
11 First line breaker
12 Second line breaker
13 Third line breaker
14 Fourth line breaker
15 Fifth line breaker
16 Sixth line breaker
20 Direct-current common section
30 First charging resistor
31 Second charging resistor
32 Third charging resistor
40 First filter capacitor
41 Second filter capacitor
42 Third filter capacitor
50 First voltage detector
51 Second voltage detector
52 Fifth voltage detector
53 Third voltage detector
54 Fourth voltage detector
60 First current detector
61 Second current detector
62 Fourth current detector
63 Third current detector
71 First contactor
72 Second contactor
73 Third contactor
74 Fourth contactor
75 Fifth contactor
76 Sixth contactor
80 Fourth current detector
81 Fifth current detector
82 Sixth current detector
90 First speed detector
91 Second speed detector
92 Fourth speed detector
93 Third speed detector
100, 110 Control devices (Control units)

The invention claimed is:

1. A propulsion control apparatus of an engine hybrid railroad vehicle comprising:
a generator driven by an engine;
a power storage device functioning as a direct-current-power supply source configured to be connectable to a direct-current common section;
first and second power converters each of which is configured to be connectable to the direct-current common section, when direct-current power from the direct-current common section is input from a first input/output end side, operates as a DC/AC converter to output desired alternating-current power from a second input/output end side different from the first input/output end, and, when alternating-current power is input from the second input/output end side, operates as an AC/DC converter to output desired direct-current power from the first input/output end side;
a plurality of motors divided into a first motor configured to be drivable by both of the first and second power converters and a second motor configured to be drivable only by the first power converter;
a group of switches that switches an electric connection destination of the generator from the second input/output end side of the second power converter to the second input/output end side of the first power converter or switches an electric connection destination of the first motor from the second input/output end side of the first power converter to the second input/output end side of the second power converter; and
a control unit that controls operations of the first power converter, the second power converter, and the group of switches according to operation forms of the first and second power converters.

2. The propulsion control apparatus of the engine hybrid railroad vehicle according to claim 1, wherein, when the first power converter is broken down, if a state of charge of the power storage device is lower than a predetermined value, the control unit causes the second power converter to operate as a DC/AC converter and supply alternating-current power from the second power converter to the generator and, after the engine starts, causes the second power converter to operate as an AC/DC converter and supply direct-current from the second power converter to the power storage device and, if the state of charge of the power storage device is higher than the predetermined value, the control unit causes the second power converter to operate as a DC/AC converter and supply alternating-current power from the second power converter to the first motor.

3. The propulsion control apparatus of the engine hybrid railroad vehicle according to claim 2, wherein
the generator is divided into a first generator and a second generator respectively driven by a first engine and a second engine,
the propulsion control apparatus includes a third power converter that is configured to be connectable to the direct-current common section and, when direct-current power from the direct-current common section is input from a first input/output end side, operates as a DC/AC converter, outputs desired alternating-current power from a second input/output end side different from the first input/output end, and supplies the desired alternating-current power to the second generator, and, when alternating-current power from the second generator is input from the second input/output end side, operates as an AC/DC converter and outputs desired direct-current power from the first input/output end side, and
when the first power converter is broken down, the control unit causes the third power converter to operate as a DC/AC converter and supply alternating-current power from the third power converter to the second generator and, after the generator starts, causes the third power converter to operate as an AC/DC converter and supply direct-current power from the third power converter to the direct-current common section.

4. The propulsion control apparatus of the engine hybrid railroad vehicle according to claim 1, wherein, when the second power converter is broken down, if a state of charge of the power storage device is lower than a predetermined value, the control unit causes the first power converter to operate as a DC/AC converter and supply alternating-current power from the first power converter to the generator and, after the engine starts, causes the first power converter to operate as an AC/DC converter and supply direct-current from the first power converter to the power storage device and, if the state of charge of the power storage device is higher than the predetermined value, the control unit causes the first power converter to operate as a DC/AC converter and supply alternating-current power from the first power converter to the first motor.

5. The propulsion control apparatus of the engine hybrid railroad vehicle according to claim 4, wherein
the generator is divided into a first generator and a second generator respectively driven by a first engine and a second engine,
the propulsion control apparatus includes a third power converter that is configured to be connectable to the direct-current common section and, when direct-current power from the direct-current common section is input from a first input/output end side, operates as a DC/AC converter, outputs desired alternating-current power from a second input/output end side different from the first input/output end, and supplies the desired alternating-current power to the second generator, and, when alternating-current power from the second generator is input from the second input/output end side, operates as an AC/DC converter and outputs desired direct-current power from the first input/output end side, and
when the second power converter is broken down, if the state of charge of the power storage device is lower than the predetermined value, the control unit causes the third power converter to operate as a DC/AC converter and supply alternating-current power from the third power converter to the second generator and, after the engine starts, causes the third power converter to operate as an AC/DC converter and supply direct-current from the third power converter to the direct-current common section.

6. A propulsion control apparatus of an engine hybrid railroad vehicle comprising:
a generator driven by an engine;
a power storage device functioning as a direct-current-power supply source configured to be connectable to a direct-current common section;
first and second power converters each of which is configured to be connectable to the direct-current common section, when direct-current power from the direct-current common section is input from a first input/output end side, operates as a DC/AC converter to output desired alternating-current power from a second input/output end side different from the first input/output end, and, when alternating-current power is input from the second input/output end side, operates as an AC/DC converter to output desired direct-current power from the first input/output end side;

a motor configured to be drivable by both of the first and second power converters;

a group of switches that switches an electric connection destination of the generator from the second input/output end side of the second power converter to the second input/output end side of the first power converter or switches an electric connection destination of the motor from the second input/output end side of the first power converter to the second input/output end side of the second power converter; and a control unit that controls operations of the first power converter, the second power converter, and the group of switches according to operation forms of the first and second power converters.

* * * * *